US012621430B2

(12) United States Patent
Jun et al.

(10) Patent No.: US 12,621,430 B2
(45) Date of Patent: May 5, 2026

(54) METHOD AND APPARATUS FOR ENCODING/DECODING IN-SCREEN PREDICTION MODE

(71) Applicant: LX Semicon Co., Ltd., Daejeon (KR)

(72) Inventors: Dong San Jun, Seoul (KR); Jung Won Kang, Seoul (KR); Sung Chang Lim, Seoul (KR); Hyun Suk Ko, Seoul (KR); Jin Ho Lee, Seoul (KR); Hui Yong Kim, Seoul (KR); Jin Soo Choi, Seoul (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/779,684

(22) Filed: Jul. 22, 2024

(65) Prior Publication Data

US 2024/0380878 A1      Nov. 14, 2024

Related U.S. Application Data

(63) Continuation of application No. 18/296,344, filed on Apr. 5, 2023, now Pat. No. 12,088,785, which is a
(Continued)

(30) Foreign Application Priority Data

Nov. 19, 2015    (KR) ........................ 10-2015-0162747
Jul. 14, 2016    (KR) ........................ 10-2016-0089419

(51) Int. Cl.
H04N 19/103        (2014.01)
H04N 19/11         (2014.01)
(Continued)

(52) U.S. Cl.
CPC ........... H04N 19/103 (2014.11); H04N 19/11 (2014.11); H04N 19/146 (2014.11);
(Continued)

(58) Field of Classification Search
CPC .... H04N 19/103; H04N 19/11; H04N 19/146; H04N 19/159; H04N 19/167;
(Continued)

(56) References Cited

U.S. PATENT DOCUMENTS 8,902,978 B2    12/2014 Lim et al.
8,953,683 B2 *   2/2015 Park ..................... H04N 19/176
                                                    375/240.12
(Continued)

FOREIGN PATENT DOCUMENTS

CA          2992235      *  4/2011
CN      103380622 A       10/2013
(Continued)

OTHER PUBLICATIONS

Chen et al., "Algorithm description of Joint Exploration Test Model 2," Feb. 20-26, 2016, Joint Video Exploration Team (JVET) of ITUT-T SG 16 WP3 and ISO/IEC JTC 1/SC 29/WG 11, JVET-B1001_v3, 32 pages.
(Continued)

*Primary Examiner* — Zaihan Jiang
(74) *Attorney, Agent, or Firm* — Birch, Stewart, Kolasch & Birch, LLP

(57) ABSTRACT

Provided are method and apparatus methods and apparatuses for encoding an intra-prediction mode based on a secondary IPM. The present invention may comprises a first decision step of determining whether an intra-prediction mode of a current block is included in a first candidate mode set including M candidate modes (M is an integer equal to or greater than 1); a second decision step of determining whether the intra-prediction mode of the current block is included in a second candidate mode set including N candidate modes (N is an integer equal to or greater than 1) based on a first determination result representing a determi-
(Continued)

nation result of the first decision step; and an intra prediction mode encoding step of encoding the intra-prediction mode of the current block based on the first determination result or a second determination result representing a determination result of the second decision step.

6 Claims, 15 Drawing Sheets

Related U.S. Application Data continuation of application No. 17/886,154, filed on Aug. 11, 2022, now Pat. No. 12,069,237, which is a continuation of application No. 15/772,284, filed as application No. PCT/KR2016/013363 on Nov. 18, 2016, now Pat. No. 11,451,767.

(51) Int. Cl.

| | |
|---|---|
| *H04N 19/146* | (2014.01) |
| *H04N 19/159* | (2014.01) |
| *H04N 19/167* | (2014.01) |
| *H04N 19/176* | (2014.01) |
| *H04N 19/44* | (2014.01) |
| *H04N 19/463* | (2014.01) |
| *H04N 19/91* | (2014.01) |

(52) U.S. Cl.
CPC ......... *H04N 19/159* (2014.11); *H04N 19/167* (2014.11); *H04N 19/176* (2014.11); *H04N 19/44* (2014.11); *H04N 19/463* (2014.11); *H04N 19/91* (2014.11)

(58) Field of Classification Search
CPC .... H04N 19/176; H04N 19/44; H04N 19/463; H04N 19/91
See application file for complete search history.

(56) References Cited

U.S. PATENT DOCUMENTS

| | | | | |
|---|---|---|---|---|
| 9,020,031 | B2 * | 4/2015 | Park | H04N 19/157 |
| | | | | 375/240.12 |
| 9,288,488 | B2 * | 3/2016 | Park | H04N 19/159 |
| 9,392,284 | B2 * | 7/2016 | Park | H04N 19/11 |
| 9,516,342 | B2 | 12/2016 | Gisquet et al. | |
| 9,961,343 | B2 * | 5/2018 | Park | H04N 19/176 |
| 10,116,941 | B2 | 10/2018 | Jeon et al. | |
| 11,451,767 | B2 | 9/2022 | Jun et al. | |
| 2004/0247189 | A1 | 12/2004 | Kwon | |
| 2010/0046621 | A1 | 2/2010 | Horiuchi et al. | |
| 2012/0033736 | A1 | 2/2012 | Sato | |
| 2012/0300846 | A1 | 11/2012 | Sugio et al. | |
| 2012/0314766 | A1 | 12/2012 | Chien et al. | |
| 2012/0328207 | A1 | 12/2012 | Sasai et al. | |
| 2013/0170546 | A1 | 7/2013 | Kim et al. | |
| 2013/0266063 | A1 | 10/2013 | Jun et al. | |
| 2014/0064359 | A1 | 3/2014 | Rapaka et al. | |
| 2014/0064607 | A1 | 3/2014 | Grossmann et al. | |
| 2014/0126629 | A1 | 5/2014 | Park et al. | |
| 2014/0233644 | A1 | 8/2014 | Lee | |
| 2015/0078446 | A1 | 3/2015 | Jun et al. | |
| 2015/0222891 | A1 | 8/2015 | Park | |
| 2015/0350657 | A1 | 12/2015 | Heo et al. | |
| 2015/0381988 | A1 | 12/2015 | Gu et al. | |
| 2017/0034536 | A1 | 2/2017 | Filippov et al. | |
| 2017/0264904 | A1 | 9/2017 | Koval et al. | |
| 2017/0272745 | A1 | 9/2017 | Liu et al. | |
| 2017/0324643 | A1 | 11/2017 | Seregin et al. | |
| 2017/0347102 | A1 | 11/2017 | Panusopone et al. | |
| 2018/0255299 | A1 | 9/2018 | Lee et al. | |
| 2018/0316913 | A1 | 11/2018 | Jun et al. | |
| 2019/0034959 | A1 | 1/2019 | Park et al. | |
| 2019/0349591 | A1 | 11/2019 | Park et al. | |
| 2020/0021800 | A1 * | 1/2020 | Kim | H04N 19/46 |
| 2020/0021806 | A1 * | 1/2020 | Kim | H04N 19/11 |
| 2020/0021807 | A1 * | 1/2020 | Kim | H04N 19/159 |
| 2022/0116606 | A1 * | 4/2022 | Pfaff | H04N 19/132 |
| 2022/0150504 | A1 * | 5/2022 | Koo | H04N 19/159 |
| 2022/0264102 | A1 * | 8/2022 | Koo | H04N 19/186 |
| 2022/0385887 | A1 | 12/2022 | Jun et al. | |
| 2024/0283910 | A1 * | 8/2024 | Ko | H04N 19/132 |

FOREIGN PATENT DOCUMENTS

| | | |
|---|---|---|
| CN | 103636203 A | 3/2014 |
| CN | 103891283 A | 6/2014 |
| CN | 103988506 A | 8/2014 |
| KR | 10-2012-0129726 A | 11/2012 |
| KR | 10-1210528 B1 | 12/2012 |
| KR | 10-2013-0037422 A | 4/2013 |
| KR | 10-2013-0067038 A | 6/2013 |
| KR | 10-2013-0072139 A | 7/2013 |
| KR | 10-2013-0099852 A | 9/2013 |
| KR | 10-2013-0137680 A | 12/2013 |
| KR | 10-2015-0059142 A | 5/2015 |
| KR | 10-2644043 B1 | 3/2024 |
| WO | WO 2012/171463 A | 12/2012 |
| WO | WO 2014/106746 A1 | 7/2014 |

OTHER PUBLICATIONS

Chen et al., "Algorithm description of Joint Exploration Test Model 2," Joint Video Exploration Team (JVET) of ITU-T SG 16 WP 3 and ISO/IEC JTC 1/SC 29/WG 11, 2nd Meeting, San Diego, CA, USA, Feb. 20-26, 2016, 32 pages.

Chuang et al., "Luma Intra Prediction Mode Coding," Joint Collaborative Team on Video Coding (JCT-VG) of ITU-T SG 16 WP3 and ISO/IEC JTc1/SC29/WG11, 6th Meeting, Torino, Italy, Jul. 14-22, 2011 (5 pages in English).

Extended European Search Report in European Appln. No. 16866698.0, dated Jun. 14, 2019, 5 pages.

International Preliminary Report on Patentability in International Appln. No. PCT/KR2016/013363, mailed on May 31, 2018, 19 pages (with English translation).

International Search Report issued on Feb. 28, 2017 in corresponding International Patent Application No. PCT/KR2016/013363 (2 pages in English and 2 pages in Korean).

Kumakura et al., "Fixing the number of mpm candidates," Joint Collaborative Team on Video Coding (JCT-VG) of ITU-T SG 16 WP3 and ISO/IEC JTc1/SC29/WG11, 6th Meeting, Torino, Italy, Jul. 14-22, 2011 (8 pages in English).

Lee et al., "Fast Intra Mode Decision Method in HEVC," The Korean Society of Broad Engineers, 2015, (pp. 560-563).

Seregin et al., "Block shape dependent intra mode coding," Joint Video Exploration Team (JVET) of ITU-T SG 16 WP 3 and ISO/IEC JTC 1/SC 29/WG 11, 4th Meeting, Chengdu, People's Republic of China, Oct. 15-21, 2016 (3 pages in English).

Seregin et al., "Neighbor based intra most probable modes list derivation," Joint Video Exploration Team (JVET) of ITU-T SG 16 WP 3 and ISO/IEC JTC 1/SC 29/WG 11, 3rd Meeting: Geneva, Switzerland, May 26-Jun. 1, 2015 (pp. 1-4).

* cited by examiner

510

0: Planar

| | Case 1 | Case 2 | Case 3 | Case 4 | Case 5 | Case 6 |
|---|---|---|---|---|---|---|
| 0 | Planar | Planar | Planar | Planar | Planar | Planar |
| 1 | DC | DC | DC | DC | DC | DC |
| 2 | | | | | | |
| 3 | | | | | | |
| 4 | | | | | | |
| 5 | | | | | | |
| 6 | | | | | | |
| 7 | | | | | | |
| 8 | | | | | | |
| 9 | | | | | | |
| 10 | | | | | | |
| 11 | | | | | | L or A |
| 12 | | | | L or A | | |
| 13 | | | | | | |
| 14 | | | | | | |
| 15 | | | | | | |
| 16 | | | | | | |
| 17 | | | | | | |
| 18 (H) | | | | | | |
| 19 | | | | | | |
| 20 | | | | | | |
| . | | | | | | |
| . | | | | | | |
| . | C-1 | | | | | |
| 34 | C | | | | | |
| . | C+1 | | | | | |
| . | C+2 | | | | | |
| . | | | | | | |
| . | | | | | | |
| 48 | | | | | | |
| 49 | | | | | | |
| 50 (V) | | | | | | |
| 51 | | | | | | |
| 52 | | | | | | |
| 53 | | | | L or A | | |
| 54 | | | | | | |
| 55 | | | | | | |
| 56 | | | | | | |
| 57 | | | | | | |
| 58 | | | L or A | | | |
| 59 | | | | | | |
| 60 | | | | | | |
| 61 | | | | | | |
| 62 | | | | | | |
| 63 | | | | | | |
| 64 | | | | | | |
| 65 | | | | | | |
| 66 | | | | | | |

| | Case 2 & 5 |
|---|---|
| 0 | Planar |
| 1 | DC |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 (H) | |
| 19 | |
| 20 | |
| . | |
| . | |
| . | |
| . | |
| 34 | |
| . | |
| . | |
| . | |
| 48 | |
| 49 | |
| 50 (V) | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | | or

| | Case 2 & 5 |
|---|---|
| 0 | Planar |
| 1 | DC |
| 2 | |
| 3 | |
| 4 | |
| 5 | |
| 6 | |
| 7 | |
| 8 | |
| 9 | |
| 10 | |
| 11 | |
| 12 | |
| 13 | |
| 14 | |
| 15 | |
| 16 | |
| 17 | |
| 18 (H) | |
| 19 | |
| 20 | |
| . | |
| . | |
| . | |
| . | |
| 34 | |
| . | |
| . | |
| . | |
| 48 | |
| 49 | |
| 50 (V) | |
| 51 | |
| 52 | |
| 53 | |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |

FIG. 15

| | Case 4 |
|---|---|
| 0 | Planar |
| 1 | DC |
| 2 | |
| 3 | |
| 4 | |
| 5 | |
| 6 | |
| 7 | |
| 8 | |
| 9 | |
| 10 | |
| 11 | Min-1 |
| 12 | L or A |
| 13 | |
| 14 | |
| 15 | |
| 16 | |
| 17 | |
| 18 (H) | |
| 19 | |
| 20 | |
| . | |
| . | |
| 34 | |
| . | |
| . | |
| . | |
| 48 | |
| 49 | |
| 50 (V) | |
| 51 | |
| 52 | |
| 53 | L or A |
| 54 | Max + 1 |
| 55 | |
| 56 | |
| 57 | |
| 58 | |
| 59 | |
| 60 | |
| 61 | |
| 62 | |
| 63 | |
| 64 | |
| 65 | |
| 66 | | or

| | Case 4 |
|---|---|
| 0 | Planar |
| 1 | DC |
| 2 | |
| 3 | |
| 4 | |
| 5 | |
| 6 | |
| 7 | |
| 8 | |
| 9 | |
| 10 | |
| 11 | Min-1 |
| 12 | L or A |
| 13 | |
| 14 | |
| 15 | |
| 16 | |
| 17 | |
| 18 (H) | |
| 19 | |
| 20 | |
| . | |
| . | |
| 34 | |
| . | |
| . | |
| . | |
| 48 | |
| 49 | |
| 50 (V) | |
| 51 | |
| 52 | |
| 53 | L or A |
| 54 | Max + 1 |
| 55 | |
| 56 | |
| 57 | |
| 58 | |
| 59 | |
| 60 | |
| 61 | |
| 62 | |
| 63 | |
| 64 | |
| 65 | |
| 66 | | or

| | Case 4 |
|---|---|
| 0 | Planar |
| 1 | DC |
| 2 | |
| 3 | |
| 4 | |
| 5 | |
| 6 | |
| 7 | |
| 8 | |
| 9 | |
| 10 | |
| 11 | |
| 12 | L or A |
| 13 | |
| 14 | |
| 15 | |
| 16 | |
| 17 | |
| 18 (H) | |
| 19 | |
| 20 | |
| . | |
| . | |
| 34 | |
| . | |
| . | |
| . | |
| 48 | |
| 49 | |
| 50 (V) | |
| 51 | |
| 52 | |
| 53 | L or A |
| 54 | |
| 55 | |
| 56 | |
| 57 | |
| 58 | |
| 59 | |
| 60 | |
| 61 | |
| 62 | |
| 63 | |
| 64 | |
| 65 | |
| 66 | |

1

METHOD AND APPARATUS FOR ENCODING/DECODING IN-SCREEN PREDICTION MODE

CROSS REFERENCE TO RELATED APPLICATIONS

This application is a continuation of application Ser. No. 18/296,344 filed Apr. 5, 2023 (now U.S. Pat. No. 12,088,785 issued on Sep. 10, 2024), which is a continuation of application Ser. No. 17/886,154 filed on Aug. 11, 2022 (now U.S. Pat. No. 12,069,237 issued on Aug. 20, 2024), which is a continuation of application Ser. No. 15/772,284 filed on Apr. 30, 2018 (now U.S. Pat. No. 11,451,767 issued on Sep. 20, 2022), which is a U.S. National Stage Application of International Application No. PCT/KR2016/013363, filed on Nov. 18, 2016, which claims the benefit under 35 USC 119(a) and 365(b) of Korean Patent Application No. 10-2015-0162747, filed on Nov. 19, 2015, and Korean Patent Application No. 10-2016-0089419, filed on Jul. 14, 2016 in the Korean Intellectual Property Office.

TECHNICAL FIELD

The present invention relates generally to a method and apparatus for encoding/decoding for signaling an intra prediction mode in an image encoding/decoding.

BACKGROUND ART

As broadcasting having High Definition (HD) resolution broadcasting is extended and provided nationwide and worldwide, many users have become accustomed to images having high resolution and high picture quality. Accordingly, many institutions are providing an impetus for the development of the next generation image devices. Furthermore, as there is a growing interest in Ultra High Definition (UHD), which has a resolution for times higher than HDTV, there is a need for technology in which an image having higher resolution and higher picture quality can be compressed and processed.

As an image compression technology, there are various technologies such as an inter-prediction technology in which pixel values included in a current picture are predicted from pictures before or after the current picture, an intra-prediction technology in which pixel values included in a current picture are predicted using pixel information in the current picture, a transformation and quantization technology for compressing energy of residual signals, and an entropy encoding technology in which a short code is allocated to a value having high appearance frequency and a long code is allocated to a value having low appearance frequency. The image data may be transmitted and stored in a state in which it is effectively compressed using these image compression technologies.

In order to transmit all information generated while encoding/decoding, an amount of bits required to be transmitted may be increased. In particular, while encoding a slice in an intra mode in a low bit rate environment, the amount of bits for intra prediction mode is predicted to occupy a large portion of the total amount of bits, so an improvement plan is required.

DISCLOSURE

Technical Problem

The present invention is intended to propose a method and apparatus for efficiently encoding/decoding an image.

In addition, the present invention provides a method and apparatus for efficiently encoding/decoding an intra-prediction mode.

In addition, the present invention provides a method and apparatus for reducing an amount of bits required for a transmission of an intra-prediction mode.

In addition, the present invention provides a method and apparatus for reducing an amount of bits generated for transmitting intra-prediction modes when an intra-prediction mode of a current encoding block is determined through a rate-distortion optimization process as the number of the intra-prediction modes is increased.

Technical Solution

According to one aspect of the present invention, there is provided a method for encoding an image, the method including: a first decision step of determining whether an intra-prediction mode of a current block is included in a first candidate mode set including M candidate modes (M is an integer equal to or greater than 1); a second decision step of determining whether the intra-prediction mode of the current block is included in a second candidate mode set including N candidate modes (N is an integer equal to or greater than 1) based on a first determination result representing a determination result of the first decision step; and an intra prediction mode encoding step of encoding the intra-prediction mode of the current block based on the first determination result or a second determination result representing a determination result of the second decision step.

According to the encoding method of the present invention, when the intra-prediction mode of the current block is determined to be included in the first candidate mode set at the first decision step, the intra prediction mode encoding step may encode result information about the first determination result and first indication information for indicating a candidate mode which is the same as the intra-prediction mode of the current block among the M candidate modes included in the first candidate mode set.

According to the encoding method of the present invention, when the intra-prediction mode of the current block is determined not to be included in the first candidate mode set at the first decision step and when the intra-prediction mode of the current block is determined to be included in the second candidate mode set at the second decision step, the intra prediction mode encoding step may encode information about the first determination result, information about the second determination result, and second indication information for indicating a candidate mode which is the same as the intra-prediction mode of the current block among the N candidate modes included in the second candidate mode set.

According to the encoding method of the present invention, when the intra-prediction mode of the current block is determined not to be included in the first candidate mode set at the first decision step and when the intra-prediction mode of the current block is determined not to be included in the second candidate mode set at the second decision step, the encoding step may encode information about the first determination result, information about the second determination result, and third indication information for indicating a mode which is the same as the intra-prediction mode of the current block among a plurality of modes each of which is not included in either the first candidate mode set or the second candidate mode set.

According to the encoding method of the present invention, the candidate mode included in the second candidate mode set may be determined based on at least one reference prediction mode that is selected from the candidate mode included in the first candidate mode set, and the reference prediction mode may be an angular mode.

According to the encoding method of the present invention, when the first candidate mode set includes a plurality of the angular modes, the reference prediction mode may be at least one of a maximum value, a minimum value, an average value, a median value derived from the plurality of the angular modes or an intra-prediction mode derived from an available block adjacent to the current block.

According to the encoding method of the present invention, the candidate mode included in the second candidate mode set may be selected from prediction modes smaller than the reference prediction mode and prediction modes greater than the reference prediction mode according to a predetermined interval.

According to the encoding method of the present invention, the method may further comprise encoding step of encoding information indicating whether the second candidate mode set is used for encoding an intra prediction mode of a block included in the image.

According to the encoding method of the present invention, the method may further comprise encoding of encoding information about the number M indicating the number of candidate modes included in the first candidate mode set or information about the number N indicating the number of candidate modes included in the second candidate mode.

According to the encoding method of the present invention, the method may further comprise an additional decision step, in addition to the first and second decision steps, and the intra prediction mode encoding step may be performed based on a determination result of the additional decision step.

According to another aspect of the present invention, there is provided a method for decoding an image comprising: decoding candidate mode set selecting information and candidate mode selecting information; selecting a candidate mode set based on the candidate mode set selecting information; and selecting one candidate mode among at least one candidate mode included in the candidate mode set based on the candidate mode selecting information as an intra-prediction mode of a current block, wherein the candidate mode set selecting information is information for selecting a candidate mode set used for deriving the intra-prediction mode of the current block among at least one candidate mode set.

According to the decoding method of the present invention, the at least one candidate mode set may include at least one of a first candidate mode set including M candidate modes (M is an integer equal to or greater than 1) and a second candidate mode set including N candidate modes (N is an integer equal to or greater than 1). According to the decoding method of the present invention, when the first candidate mode set is selected based on the candidate mode set selecting information, the candidate mode selecting information may be information for indicating one candidate mode among the M candidate modes included in the first candidate mode set.

According to the decoding method of the present invention, when the second candidate mode set is selected based on the candidate mode set selecting information, the candidate mode selecting information may be information for indicating one candidate mode among the N candidate modes included in the second candidate mode set.

According to the decoding method of the present invention, when neither the first nor second candidate mode sets is selected based on the candidate mode set selecting information, the candidate mode selecting information may be information for indicating one candidate mode among at least one candidate mode that is not included in either the first or second candidate mode sets.

According to the decoding method of the present invention, the candidate mode included in the second candidate mode set may be determined based on at least one reference prediction mode that is selected from the candidate modes included in the first candidate mode set, and the reference prediction mode may be an angular mode.

According to the decoding method of the present invention, when the first candidate mode set includes a plurality of the angular modes, the reference prediction mode may be at least one of a maximum value, a minimum value, an average value, a median value derived from the plurality of the angular modes or an intra-prediction mode derived from an available block adjacent to the current block.

According to the decoding method of the present invention, the candidate mode included in the second candidate mode set may be selected from prediction modes smaller than the reference prediction mode and prediction modes greater than the reference prediction mode according to a predetermined interval.

According to the decoding method of the present invention, the method may further comprise decoding information indicating whether the second candidate mode set is used for decoding an intra prediction mode of a block included in the image.

According to the decoding method of the present invention, the method may further comprise decoding information about the number M indicating the number of candidate modes included in the first candidate mode set or information about the number N indicating the number of candidate modes included in the second candidate mode.

Advantageous Effects

According to the present invention, an image may be efficiently encoded/decoded.

In addition, according to the present invention, an intra-prediction mode may be efficiently encoded/decoded during.

Further, according to the present invention, an amount of bits required for a transmission of an intra-prediction mode may be reduced.

Further, according to the present invention, when the number of intra-prediction modes is increased, encoding efficiency for transmitting an intra prediction mode may be improved.

DESCRIPTION OF DRAWINGS

FIG. 12 is a diagram explaining an example of configuration of 6 MPM candidate modes when up to 67 intra-prediction modes are supported.

FIG. 13 is a diagram explaining various embodiments of configuring secondary IPM candidate based on MPM candidate configured according to a first case (Case 1) of FIG. 12.

FIG. 14 is a diagram explaining various embodiments of configuring secondary IPM candidate based on MPM candidate configured according to a second case (Case 2) and a fifth case (Case 5) of FIG. 12.

FIG. 15 is a diagram explaining various embodiments of configuring secondary IPM candidate based on an MPM candidate configured according to a fourth case (Case 4) of FIG. 12.

MODE FOR INVENTION

Figure 1:
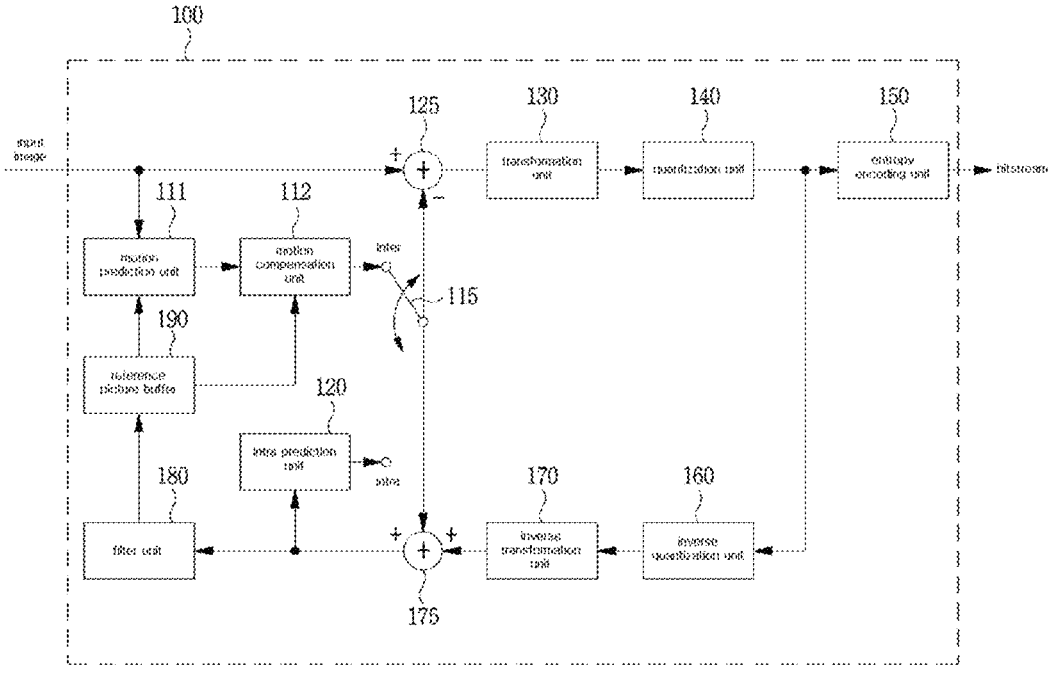
FIG. 1 is a block diagram showing a configuration of an image encoding apparatus to which an embodiment of the present invention is applied.

Since a variety of modifications may be made to the present invention and there are various embodiments of the present invention, examples will now be provided with reference to drawings and will be described in detail. However, the present invention is not limited thereto, and the exemplary embodiments can be construed as including all modifications, equivalents, or substitutes in a technical concept and a technical scope of the present invention. The similar reference numerals refer to the same or similar functions in various aspects. In the drawings, the shapes and dimensions of elements may be exaggerated for clarity, and the same reference numerals will be used throughout to designate the same or like elements. In the following detailed description of the present invention, references are made to the accompanying drawings that show, by way of illustration, specific embodiments in which the invention may be practiced. These embodiments are described in sufficient detail to enable those skilled in the art to implement the present disclosure. It should be understood that various embodiments of the present disclosure, although different, are not necessarily mutually exclusive. For example, specific features, structures, and characteristics described herein, in connection with one embodiment, may be implemented within other embodiments without departing from the spirit and scope of the present disclosure. In addition, it should be understood that the location or arrangement of individual elements within each disclosed embodiment may be modified without departing from the spirit and scope of the present disclosure. The following detailed description is, therefore, not to be taken in a limiting sense, and the scope of the present disclosure is defined only by the appended claims, appropriately interpreted, along with the full range equivalent to what the claims claim.

Terms used in the specification, 'first', 'second', etc. can be used to describe various components, but the components are not to be construed as being limited to the terms. The terms are only used to differentiate one component from other components. For example, the 'first' component may be named the 'second' component without departing from the scope of the present invention and the 'second' component may also be similarly named the 'first' component. The term 'and/or' includes a combination of a plurality of items or any one of a plurality of terms.

When an element is mentioned to be "coupled" or "connected" to another element, this may mean that it is directly coupled or connected to the other element, but it is to be understood that yet another element may exist in-between. On the other hand, when an element is mentioned to be "directly coupled" or "directly connected" to another element, it is to be understood that there are no other elements in-between.

Furthermore, constitutional parts shown in the embodiments of the present invention are independently shown so as to represent characteristic functions different from each other. Thus, it does not mean that each constitutional part is constituted in a constitutional unit of separated hardware or software. In other words, each constitutional part includes each of enumerated constitutional parts for convenience. Thus, at least two constitutional parts of each constitutional part may be combined to form one constitutional part or one constitutional part may be divided into a plurality of constitutional parts to perform each function. The embodiment where each constitutional part is combined and the embodiment where one constitutional part is divided are also included in the scope of the present invention, if not departing from the essence of the present invention.

The terms used in the present specification are merely used to describe particular embodiments, and are not intended to limit the present invention. An expression used in the singular encompasses the expression of the plural, unless it has a clearly different meaning in the context. In the present specification, it is to be understood that terms such as "including", "having", etc., are intended to indicate the existence of the features, numbers, steps, actions, elements, parts, or combinations thereof disclosed in the specification, and are not intended to preclude the possibility that one or more other features, numbers, steps, actions, elements, parts, or combinations thereof may exist or may be added. In other words, when a specific element is referred to as being "included", elements other than the corresponding element are not excluded, but additional elements may be included in embodiments of the present invention or the scope of the present invention.

In addition, some of constituents may not be indispensable constituents performing essential functions of the present invention but be selective constituents improving only performance thereof. The present invention may be implemented by including only the indispensable constitutional parts for implementing the essence of the present invention except the constituents used in improving performance. The structure including only the indispensable constituents except the selective constituents used in improving only performance is also included in the scope of the present invention.

Hereinafter, exemplary embodiments of the present invention will be described in detail with reference to the accompanying drawings. In describing exemplary embodiments of the present invention, well-known functions or constructions will not be described in detail since they may unnecessarily obscure the understanding of the present invention. The same constituent elements in the drawings are denoted by the same reference numerals, and a repeated description of the same elements will be omitted.

In addition, hereinafter, an image may refer to a picture constituting a video, or may refer to a video. For example, "encoding and/or decoding an image" may refer to "encoding and/or decoding a video", or may refer to "encoding and/or decoding a single image among images constituting a video". Herein, the picture may refer to an image.

Encoder: may refer to an encoding apparatus.

Decoder: may refer to a decoding apparatus.

Parsing: may refer to determining a syntax element value by performing entropy decoding, or may refer to an entropy decoder.

Block: may refer to a sample of an M×N matrix. Herein, M and N are positive integers. A block may refer to a sample matrix of a two dimensional matrix.

Unit: may refer to a unit of encoding or decoding an image. When encoding and decoding an image, a unit may be an area generated by partitioning an image. Alternatively, a unit may refer to a divided unit of one image when the image is sub-divided and encoded or decoded. While encoding and decoding, a predetermined process may be performed for each unit. A single unit may be divided into smaller sub-units. The unit may also refer to a block, a macro block (MB), a coding unit (CU), a prediction unit (PU), a transform unit (TU), a coding block (CB), a prediction block (PB), or a transform block (TB) according to a function thereof. The unit may refer to a luma component block to be distinguished from the block, a chroma component block in response to the luma component block, and may refer to each block including a syntax element thereof. The unit may have various sizes and shapes. In particular, the shape of the unit may include two-dimensional forms such as a rectangle, cube, trapezoid, triangle, pentagon, etc. In addition, the shape of the unit may include a geometrical figure. Further, unit information may include at least one of a unit type such as encoding unit, prediction unit, transform unit, etc.; a unit size; a unit depth; and a sequence of unit encoding and decoding, etc.

Reconstructed neighbor unit: may refer to a reconstructed unit that is already spatially/temporally encoded or decoded, and adjacent to an encoding/decoding target unit.

Depth: indicates a degree of partitions of a unit. In a tree structure, the highest node may refer to a root node, and the lowest node may refer to a leaf node.

Symbol: may refer to a syntax element and a coding parameter of an encoding/decoding target unit, a value of transform coefficient, etc.

Parameter set: may correspond to header information in a structure within a bit stream. At least one of a video parameter set, a sequence parameter set, a picture parameter set, and an adaptation parameter set may be included in the parameter set. In addition, the parameter set may include information of a slice header and a tile header.

Bitstream: may refer to a bit string including encoded image information.

Coding parameter: may include not only information encoded by an encoder and then transmitted to a decoder along with a syntax element, but also information that may be derived in an encoding or decoding process, or may refer to a parameter necessary for encoding and decoding. For example, the coding parameter may include at least one value and/or statistic of an intra-prediction mode, an inter-prediction mode, an intra-prediction direction, motion information, a motion vector, a reference image index, an inter-prediction direction, an inter-prediction indicator, a reference image list, a motion vector predictor, a motion merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, an image displaying/outputting order, slice information, tile information, a picture type, information about whether or not a motion merge mode is used, information about whether or not a skip mode is used, a block size, a block depth, block partition information, a unit size, unit partition information, etc.

Prediction unit: may refer to a basic unit when performing inter prediction or intra prediction, and when performing compensation for the prediction. The prediction unit may be divided into multiple partitions. Each of the partitions may also be the basic unit when performing inter prediction or intra prediction, and when performing the compensation for the prediction. The partitioned prediction unit may also refer to a prediction unit. In addition, a single prediction unit may be divided into smaller sub-units. The prediction unit may have various sizes and shapes. In particular, the shape of the unit may include two-dimensional forms such as a rectangle, square, trapezoid, triangle, pentagon, etc. In addition, the shape of the unit may include a geometrical figure.

Prediction unit partition: may refer to a partitioning form of a prediction unit.

Reference picture list: may refer to a list including at least one reference picture that is used for inter prediction or motion compensation. Types of the reference list may include a list combined (LC), L0 (List 0), L1 (List 1), L2 (List 2), L3 (List 3), etc. At least one reference picture list may be used for inter prediction.

Inter-prediction indicator: may refer to an inter-prediction direction (unit-direction prediction, bi-direction prediction) of an encoding/decoding target block. Alternatively, the indicator may refer to a number of reference pictures used for generating a prediction block of the encoding/decoding target block, or may refer to a number of prediction blocks used when the encoding/decoding target block performs motion compensation.

Reference picture index: may refer to an index of a specific picture within a reference picture list.

Reference picture: may refer to a reference picture that is referenced by a specific unit used for inter prediction or motion compensation. Alternately, a reference image may refer to a reference picture.

Motion vector: refers to a two-dimensional matrix used for inter prediction or motion compensation, or may be an offset between an encoding/decoding target image and a reference image. For example, (mvX, mvY) may indicate a moving vector, mvX may be a horizontal component, and mvY may be vertical component.

Motion vector candidate: may refer to a unit that becomes a prediction candidate when predicting a motion vector, or may refer to a moving vector of the unit.

Motion vector candidate list: may refer to a list configured with a moving vector candidate.

Motion vector candidate index: may refer to an indicator that indicates a motion vector candidate within a moving vector candidate list, or may refer to an index of a motion vector predictor.

Motion information: may refer to information including at least one of a motion vector, a reference image index, an inter-prediction indicator, reference image list information, a reference image, a motion vector candidate, a motion vector candidate index, etc.

Transform unit: may refer to a basic unit when performing encoding/decoding of a residual signal such as transform, inverse transform, quantization, inverse quantization, and encoding/decoding of transform coefficient. A single unit may be divided into smaller sub-units. The unit may have various sizes and shapes. In particular, the shape of the unit may include a two-dimensional form such as a rectangle, square, trapezoid, triangle, pentagon, etc. In addition, the shape of the unit may also include a geometrical figure.

Scaling: may refer to a process of multiplying a factor to a transform coefficient level, and as a result, a transform coefficient may be generated. The scaling may also refer to inverse quantization.

Quantization parameter: may refer to a value used for scaling a transform coefficient level in a quantization and inverse quantization. Herein, a quantization parameter may be a value mapped to a step size of the quantization.

Delta quantization parameter: may refer to a residual value between a predicted quantization parameter and a quantization parameter of an encoding/decoding target unit.

Scan: may refer to a method of sorting coefficient orders within a block or a matrix. For example, sorting a two-dimensional matrix to a one dimensional matrix may refer to scanning or inverse scanning.

Transform coefficient: may be a coefficient value generated after performing a transform. In the present invention, a transform coefficient level that is quantized by applying quantization to a transform coefficient may be included in the transform coefficient.

Non-zero transform coefficient: may refer to a transform coefficient in which a value thereof or a size thereof is not 0.

Quantization matrix: may refer to a matrix used for quantization and inverse quantization in order to improve quality of an image. The quantization matrix may also refer to a scaling list.

Quantization matrix coefficient: may refer to each element of a quantization matrix. The quantization matrix coefficient may also refer to a matrix coefficient.

Default matrix: may refer to a predetermined quantization matrix defined in an encoder and a decoder in advance.

Non-default matrix: may refer to a quantization matrix transmitted from/received by a user, and is not defined in an encoder and a decoder in advance.

FIG. 1 is a block diagram showing a configuration of an image encoding apparatus to which an embodiment of the present invention is applied.

The encoding apparatus 100 may be a video encoding apparatus or an image encoding apparatus. A video may include at least one image. The encoding apparatus 100 may encode the at least one image of the video in order of time.

Referring to FIG. 1, the encoding apparatus 100 may include a motion prediction unit 111, motion compensation unit 112, an intra-prediction unit 120, a switch 115, a subtractor 125, a transformation unit 130, a quantization unit 140, an entropy encoding unit 150, a inverse quantization unit 160, an inverse transformation unit 170, an adder 175, a filter unit 180, and a reference picture buffer 190.

The encoding apparatus 100 may encode an input image in an intra mode or an inter mode or both. In addition, the encoding apparatus 100 may generate a bitstream by encoding the input image, and may output the generated bitstream. When the intra mode is used as a prediction mode, the switch 115 may be switched to intra. When the inter mode is used as a prediction mode, the switch 115 may be switched to inter. Herein, the intra mode may be referred to as an intra-prediction mode, and the inter mode may be referred to as an inter-prediction mode. The encoding apparatus 100 may generate a prediction signal of an input block of the input image. The prediction signal, which is a block unit, may be referred to as a prediction block. In addition, after generating the prediction block, the encoding apparatus 100 may encode a residual value between the input block and the prediction block. The input image may be referred to as a current image that is a target of a current encoding. The input block may be referred to as a current block or as an encoding target block that is a target of the current encoding.

When the prediction mode is the intra mode, the intra-prediction unit 120 may use a pixel value of a previously encoded block adjacent to the current block as a reference pixel. The intra-prediction unit 120 may perform spatial prediction by using the reference pixel for spatial prediction, and may generate prediction samples of the input block by using the spatial prediction. Herein, intra prediction may mean intra-frame prediction.

When the prediction mode is the inter mode, the motion prediction unit 111 may search for a region that is optimally matched with the input block of a reference image in a motion predicting process, and may derive a motion vector by using the searched region. The reference image may be stored in the reference picture buffer 190.

The motion compensation unit 112 may generate the prediction block by performing motion compensation using the motion vector. Herein, the motion vector may be a two-dimensional vector that is used in inter prediction. In addition, the motion vector may indicate an offset between the current image and the reference image. Herein, inter prediction may refer to an inter-frame prediction.

When a value of the motion vector is not an integer, the motion prediction unit 111 and the motion compensation unit 112 may generate the prediction block by applying an interpolation filter to a partial region in the reference image. In order to perform inter prediction or the motion compensation, based on the coding unit, a motion prediction method of the prediction unit included in the coding unit and a compensation method of the motion prediction may be determined among a skip mode, a merge mode, and an AMVP mode. In addition, the inter prediction or the motion compensation may be performed depending on the modes.

The subtractor 125 may generate a residual block by using the residual value between the input block and the prediction block. The residual block may be referred to as a residual signal.

The transformation unit 130 may generate a transform coefficient by transforming the residual block, and may output the transform coefficient. Herein, the transform coefficient may be a coefficient value generated by transforming the residual block. In a transform skip mode, the transformation unit 130 may skip the transformation of the residual block.

A quantized transform coefficient level may be generated by applying quantization to the transform coefficient. Hereinafter, the quantized transform coefficient level may be referred to as the transform coefficient in the embodiments of the present invention.

The quantization unit 140 may generate the quantized transform coefficient level by quantizing the transform coefficient according to the quantization parameter, and may output the quantized transform coefficient level. Here, the quantization unit 140 may quantize the transform coefficient by using a quantization matrix.

The entropy encoding unit 150, according to the probability distribution, may generate the bitstream by performing entropy encoding on values calculated by the quantization unit 140 or on coding parameter values calculated in an encoding process, etc., and may output the bitstream. The entropy encoding unit 150 may entropy encode information for decoding an image, and information of a pixel of an image. For example, the information for decoding an image may include a syntax element, etc.

When the entropy encoding is applied, symbols are represented by allocating a small number of bits to the symbols having high occurrence probability and allocating a large number of bits to the symbols having low occurrence probability, thereby reducing the size of the bitstream of encoding target symbols. Therefore, compression performance of the image encoding may be increased through the entropy encoding. For the entropy encoding, the entropy encoding unit 150 may use an encoding method such as exponential golomb, context-adaptive variable length coding (CAVLC), and context-adaptive binary arithmetic coding (CABAC). For example, the entropy encoding unit 150 may entropy encode by using a variable length coding/code (VLC) table. In addition, the entropy encoding unit 150 may derive a binarization method of the target symbol and a probability model of a target symbol/bin, and may perform arithmetic coding by using the derived binarization method or the derived probability model thereafter.

In order to encode the transform coefficient level, the entropy encoding unit 150 may change a two-dimensional block form coefficient into a one-dimensional vector form by using a transform coefficient scanning method. For example, the two-dimensional block form coefficient may be changed into the one-dimensional vector form by scanning the coefficient of the block with up-right scanning. According to the size of the transform unit and the intra prediction mode, vertical scanning that scans the two-dimensional block form coefficient in column direction, and horizontal scanning that scans the two-dimensional block form coefficient in a row direction may be used rather than up-right scanning. In other words, the scanning method among up-right scanning, vertical direction scanning, and horizontal direction scanning may be determined according to the size of the transform unit and the intra-prediction mode.

The coding parameter may include not only information encoded by an encoder and then delivered to a decoder along with a syntax element, but also information that may be derived in an encoding or decoding process, or may refer to a parameter necessary for encoding and decoding. For example, the coding parameter may include at least one value or statistic of an intra-prediction mode, an inter-prediction mode, an intra-prediction direction, motion information, a motion vector, a reference image index, an inter-prediction direction, an inter-prediction indicator, a reference image list, a motion vector predictor, a motion merge candidate, a type of transform, a size of transform, information about whether or not an additional transform is used, filter information within a loop, information about whether or not a residual signal is present, a quantization parameter, a context model, a transform coefficient, a transform coefficient level, a coded block pattern, a coded block flag, an image displaying/outputting order, slice information, tile information, a picture type, information about whether or not a motion merge mode is used, information about whether or not a skip mode is used, a block size, a block depth, block partition information, a unit size, unit partition information, etc.

The residual signal may mean the difference between the original signal and the prediction signal. Alternatively, the residual signal may be a signal generated by transforming the difference between the original signal and the prediction signal. Alternatively, the residual signal may be a signal generated by transforming and quantizing the difference between the original signal and the prediction signal. The residual block may be the residual signal, which is a block unit.

When the encoding apparatus 100 performs encoding by using inter prediction, the encoded current image may be used as the reference image for another image(s) that will be processed thereafter. Therefore, the encoding apparatus 100 may decode the encoded current image, and may store the decoded image as the reference image. In order to perform the decoding, inverse quantization and inverse transformation may be performed on the encoded current image.

A quantized coefficient may be dequantized by the inverse quantization unit 160, and may be inversely transformed by the inverse transformation unit 170. The dequantized and inversely transformed coefficient may be added to the prediction block by the adder 175, whereby a reconstructed block may be generated.

The reconstructed block may pass the filter unit 180. The filter unit 180 may apply at least one of a deblocking filter, a sample adaptive offset (SAO), and an adaptive loop filter (ALF) to the reconstructed block or a reconstructed image. The filter unit 180 may be referred to as an in-loop filter.

The deblocking filter may remove block distortion that occurs at boundaries between the blocks. In order to determine whether or not the deblocking filter is operated, it is possible to determine whether or not the deblocking filter is applied to the current block based on pixels included in several rows or columns in the block. When the deblocking filter is applied to the block, a strong filter or a weak filter may be applied depending on required deblocking filtering strength. In addition, in applying the deblocking filter, horizontal direction filtering and vertical direction filtering may be processed in parallel when performing vertical filtering and horizontal filtering.

The sample adaptive offset may add an optimum offset value to the pixel value in order to compensate for an encoding error. The sample adaptive offset may correct an offset between the deblocking filtered image and the original image by a pixel. In order to perform the offset correction on a specific picture, it is possible to use a method of applying an offset correction in consideration of edge information of each pixel or a method of partitioning pixels of an image into a predetermined number of regions, determining a region to be subjected to perform an offset correction, and applying the offset correction to the determined region.

The adaptive loop filter may filter based on a value obtained by comparing the reconstructed image and the original image. Pixels of an image may be partitioned into predetermined groups, a single filter being applied to each of the groups is determined, and different filtering may be performed at each of the groups. Information about whether or not the adaptive loop filter is applied may be transmitted to each coding unit (CU). A shape and a filter coefficient of an adaptive loop filter being applied to each block may vary. In addition, an adaptive loop filter having the same form (fixed form) may be applied regardless of characteristics of a target block.

The reconstructed block having passed the filter unit 180 may be stored in the reference picture buffer 190.

Figure 2:
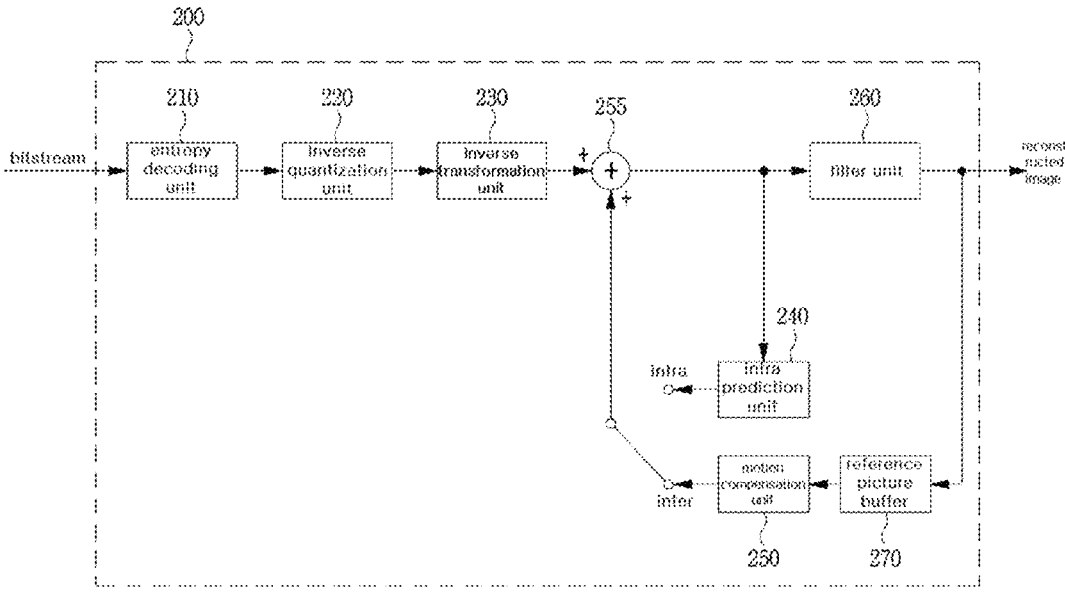
FIG. 2 is a block diagram showing a configuration of an image decoding apparatus to which an embodiment of the present invention is applied.

FIG. 2 is a block diagram showing a configuration of an image decoding apparatus to which an embodiment of the present invention is applied.

The decoding apparatus 200 may be a video decoding apparatus or an image decoding apparatus.

Referring to FIG. 2, the decoding apparatus 200 may include an entropy decoding unit 210, a inverse quantization unit 220, an inverse transformation unit 230, an intra-prediction unit 240, motion compensation unit 250, an adder 255, a filter unit 260, and a reference picture buffer 270.

The decoding apparatus 200 may receive the bitstream outputted from the encoding apparatus 100. The decoding apparatus 200 may decode the bitstream in the intra mode or the inter mode. In addition, the decoding apparatus 200 may generate a reconstructed image by decoding, and may output the reconstructed image.

When the intra mode is used as a prediction mode used in decoding, the switch may be switched to intra. When the inter mode is used as the prediction mode used in decoding, the switch may be switched to inter.

The decoding apparatus 200 may obtain the reconstructed residual block from the inputted bitstream, and may generate the prediction block.

When the reconstructed residual block and the prediction block are obtained, the decoding apparatus 200 may generate the reconstructed block, which is a decoding target block, by adding the reconstructed residual block and the prediction block. The decoding target block may be referred to as a current block.

The entropy decoding unit 210 may generate symbols by entropy decoding the bitstream according to the probability distribution. The generated symbols may include a symbol having a form of a quantized transform coefficient level.

Herein, a method of entropy decoding may be similar to the above-described method of the entropy encoding. For example, the method of entropy decoding may be an inverse process of the above-described method of entropy encoding.

In order to decode the transform coefficient level, the entropy decoding unit 210 may change a one-dimensional block form coefficient into a two-dimensional vector form by using a transform coefficient scanning method. For example, the one-dimensional block form coefficient may be changed into the two-dimensional vector form by scanning the coefficient of the block with up-right scanning. According to the size of the transform unit and the intra-prediction mode, vertical scanning and horizontal scanning may be used rather than up-right scanning. In other words, the scanning method among up-right scanning, vertical direction scanning, and horizontal direction scanning may be determined according to the size of the transform unit and the intra-prediction mode.

The quantized transform coefficient level may be dequantized by the inverse quantization unit 220, and may be inversely transformed by the inverse transformation unit 230. The quantized transform coefficient level is dequantized and is inversely transformed so as to generate a reconstructed residual block. Here, the inverse quantization unit 220 may apply the quantization matrix to the quantized transform coefficient level.

When the intra mode is used, the intra-prediction unit 240 may generate a prediction block by performing the spatial prediction that uses the pixel value of the previously decoded block around the decoding target block.

When the inter mode is used, the motion compensation unit 250 may generate the prediction block by performing motion compensation that uses both the motion vector and the reference image stored in the reference picture buffer 270. When the value of the motion vector is not an integer, the motion compensation unit 250 may generate the prediction block by applying the interpolation filter to the partial region in the reference image. In order to perform motion compensation, based on the coding unit, a motion prediction method of the prediction unit included in the coding unit and a compensation method of the motion prediction may be determined among a skip mode, a merge mode, an AMVP mode, and a current picture reference mode. In addition, the inter prediction or the motion compensation may be performed depending on the modes. Herein, the current picture reference mode may mean a prediction mode using a previously reconstructed region within the current picture having the decoding target block. The previously reconstructed region may be not adjacent to the decoding target block. In order to specify the previously reconstructed region, a fixed vector may be used for the current picture reference mode. In addition, a flag or an index indicating whether or not the decoding target block is a block decoded in the current picture reference mode may be signaled, and may be derived by using the reference picture index of the decoding target block. The current picture for the current picture reference mode may exist at a fixed position (for example, a position of refIdx=0 or the last position) within the reference picture list for the decoding target block. In addition, it is possible to be variably positioned within the reference picture list, and to this end, an additional reference picture index indicating a position of the current picture may be signaled.

The reconstructed residual block may be added to the prediction block by the adder 255. A block generated by adding the reconstructed residual block and the prediction block may pass the filter unit 260. The filter unit 260 may apply at least one of the deblocking filter, the sample adaptive offset, and the adaptive loop filter to the reconstructed block or to the reconstructed image. The filter unit 260 may output the reconstructed image. The reconstructed image may be stored in the reference picture buffer 270, and may be used in inter prediction.

Figure 3:
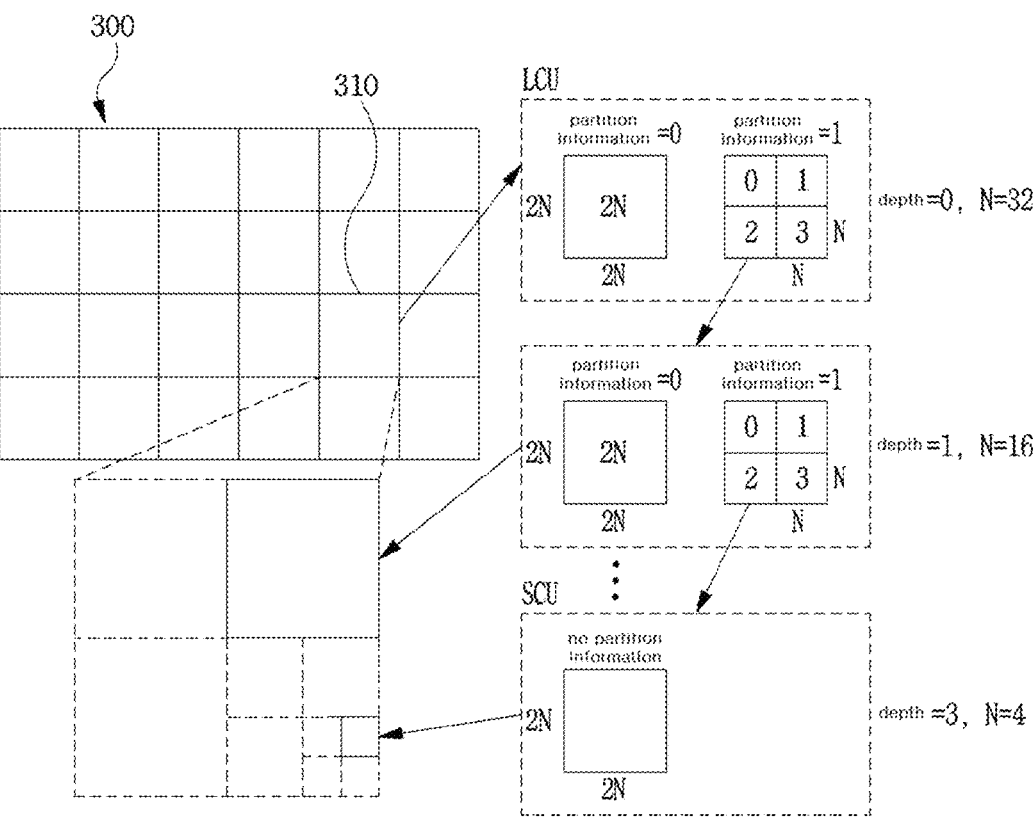
FIG. 3 is a diagram schematically showing a partition structure of an image when encoding the image.

FIG. 3 is a diagram schematically showing the partition structure of an image when encoding and decoding the image. FIG. 3 schematically shows an example of partitioning a single unit into a plurality of units of a lower layer.

In order to efficiently partition an image, a coding unit (CU) may be used while encoding and decoding. A unit may refer to 1) a syntax element, and 2) a block including sample images. For example, "a partition of a unit" may refer to "a partition of a block corresponding to the unit". Block partitioning information may include depth information of the unit. The depth information may indicate a number of partitions in the unit and/or a degree of partitioning.

Referring to FIG. 3, an image 300 is sequentially partitioned in the largest coding unit (hereinafter referred to as an LCU), and a partition structure is determined based on the LCUs. Herein, the LCU may be used as a coding tree unit (CTU). A single unit may include depth information based on a tree structure and may be hierarchically partitioned. Each of partitioned unit of a lower layer may include depth information. The depth information indicates a number of partitions in the unit and/or a degree of partitioning, and thus may include unit size information of the lower layer.

The partition structure may refer to a distribution of coding units (CUs) within the LCU 310. The CU may be a unit used for efficiently encoding an image. The distribution may be determined based on whether or not a single CU will be partitioned in plural (a positive integer more than 2 including 2, 4, 8, 16, etc.). A width size and a height size of each partitioned CU may be a half width size and a half height size of the single CU. Alternatively, the width size and the height size of each partitioned CU may be smaller than the width size and the height size of the single CU according to a number of partitioned units. Likewise, the partitioned CU may be recursively partitioned in a plurality of CUs each reduced by half in a width size and a height size from the partitioned CU.

Herein, the partition of a CU may be recursively performed up to a predetermined depth. Depth information may be information indicating a size of the CU. Depth information of each CU may be stored therein. For example, the depth of an LCU may be 0, and the depth of the smallest coding unit (SCU) may be a predetermined maximum depth. Herein, the LCU may be a CU having a maximum CU size as described above, and the SCU may be a CU having a minimum CU size.

Whenever the LCU 310 is partitioned and a width size and a height size thereof are reduced, the depth of a CU is increased by 1. A CU on which partitioning has not been performed may have a 2N×2N size for each depth, and a CU on which partitioning has been performed may be partitioned from a CU having a 2N×2N size to a plurality of CUs each having an N×N size. The size of N is reduced by half whenever the depth is increased by 1.

Referring to FIG. 3, the size of an LCU having a minimum depth of 0 may be 64×64 pixels, and the size of a SCU having a maximum depth of 3 may be 8×8 pixels. Herein, the LCU having 64×64 pixels may be represented by a depth of 0, a CU having 32×32 pixels may be represented by a depth of 1, a CU having 16×16 pixels may be represented by a depth of 2, and the SCU having 8×8 pixels may be represented by a depth of 3.

Further, information about whether or not a specific CU will be partitioned may be represented through 1-bit partition information for each CU. All CUs, except for the SCU, may include the partition information. For example, when a CU is not partitioned, partition information may be 0. Alternatively, when a CU is partitioned, partition information may be 1.

Figure 4:
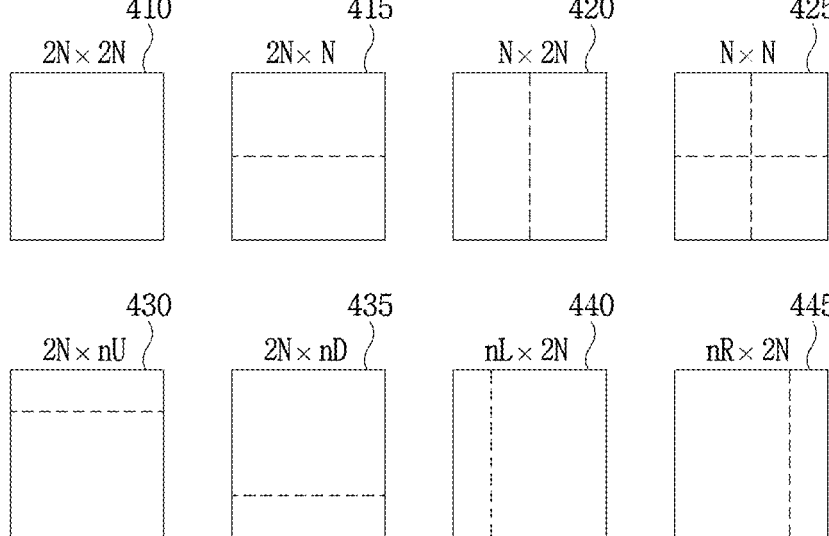
FIG. 4 is a diagram showing forms of a prediction unit (PU) that may be included in a coding unit (CU).

FIG. 4 is a diagram showing the forms of a prediction unit (PU) that may be included in a CU.

A CU that is no longer partitioned, from among CUs partitioned from the LCU, may be partitioned into at least one PU. Such a process may also refer to partitioning.

A prediction unit (PU) may be a basic unit of a prediction. The PU may be encoded and decoded in any one of a skip mode, inter-prediction mode, and intra-prediction mode. The PU may be partitioned in various forms depending on each mode.

As shown in FIG. 4, in the skip mode, there may not be a partition within the CU. In addition, a 2N×2N mode 410 having the same size as a CU may be supported without a partition within the CU.

In the inter-prediction mode, 8 partitioned forms, for example, the 2N×2N mode 410, a 2N×2N mode 415, an N×2N mode 420, an N×N mode 425, a 2N×NU mode 430, a 2N×nD mode 435, an nL×2N mode 440, and an nR×2N mode 445 may be supported within a CU.

Figure 5:
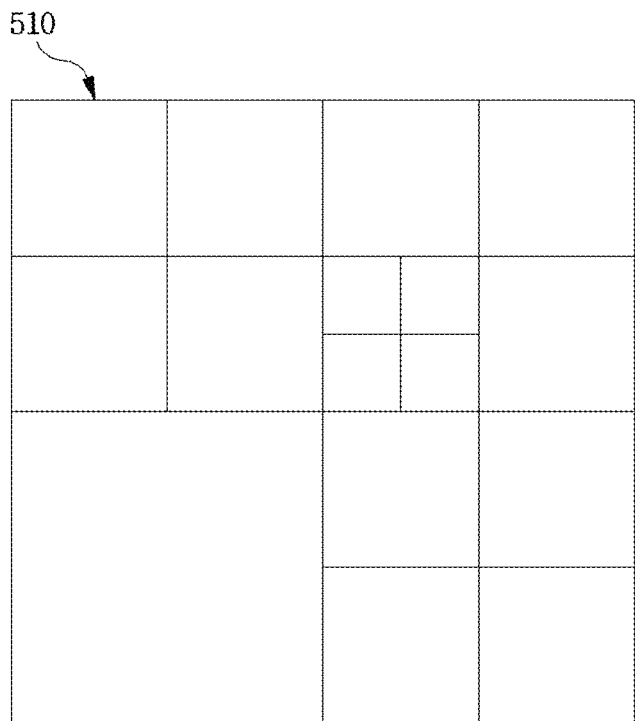
FIG. 5 is a diagram showing forms of a transform unit (TU) that may be included in a coding unit (CU).

FIG. 5 is a diagram showing forms of a transform unit (TU) that may be included in a CU.

A transform unit (TU) may be a basic unit used for a transformation, a quantization, a reverse transform, and a inverse quantization process within a CU. The TU may have a rectangular or square form. The TU may be dependently determined by a size and/or a form of a CU.

A CU that is no longer partitioned, from among CUs partitioned from the LCU, may be partitioned into one or more TUs. Herein, the partition structure of the TU may be a quad-tree structure. For example, as shown in FIG. 5, a single CU 510 may be partitioned once or more depending on a quad-tree structure, so that the CU 510 is formed of TUs having various sizes. Alternatively, the single CU 510 may be partitioned into at least one TU based in a number of horizontal lines and/or vertical lines that partition the CU.

The CU may be partitioned into TUs that are symmetrical to each other, or may be partitioned into TUs that are asymmetrical to each other. In order to partition into asymmetrical TUs, information of size and form of the TU may be signaled, or may be derived from information of size and form of the CU.

While performing a transform, a residual block may be transformed by using one of predetermined methods. For example, the predetermined methods may include a discrete cosine transform (DCT), a discrete sine transform (DST), or a Karhunen-Loève transform (KLT). In order to determine the method of transforming the residual block, the method may be determined by using at least one of inter-prediction mode information of the prediction unit, intra-prediction mode information of the prediction unit, or a size and form of the transform block. Alternatively, information indicating the method may be signaled in some cases.

Figure 6:
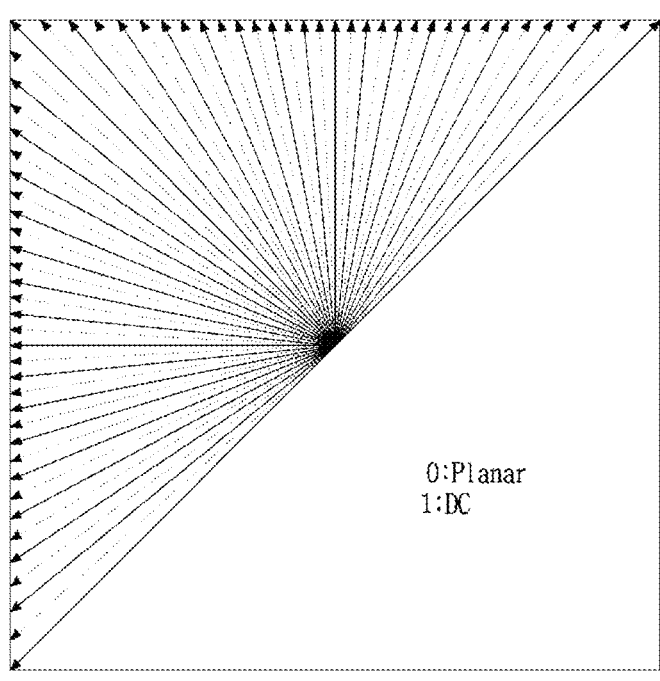
FIG. 6 is a diagram showing an example of intra-prediction process.

FIG. 6 is a diagram showing an example of showing an intra-prediction mode.

A number of intra-prediction modes may vary according to a size of a prediction unit (PU), or may be fixed to N numbers regardless of the size of the prediction unit (PU). Herein, the N numbers may include 35, and 67, or may be a positive integer more than 1. For example, a predetermined intra-prediction mode of an encoder/decoder may include two non-angular modes and 65 angular modes, as shown in FIG. 6. The two non-angular modes may include a DC mode and a planar mode.

The number of intra-prediction modes may differ according to a type of color component. For example, the number of intra-prediction modes may be varied depending on whether the color component is a luma signal or a chroma signal.

The PU may have a square form having an N×N or a 2N×2N size. The N×N size may include 4×4, 8×8, 16×16, 32×32, 64×64, 128×128, etc. Alternatively, the PU may have an M×N size. Herein, M and N may be a positive integer more than 2, and M and N may be different numbers. A unit of PU may be a size of at least one of CU, PU, and TU.

Intra encoding and/or decoding may be performed by using a sample value included in a neighboring reconstructed unit or a coding parameter.

In intra prediction, a prediction block may be generated by applying a reference sample filter to a reference pixel through using at least one of sizes of encoding/decoding target blocks. Types of the reference filter applied to the reference pixel may differ. For example, the reference filter may differ according to the intra-prediction mode of an encoding/decoding target block, a size/form of encoding/decoding target block, or a position of the reference pixel. "Types of the reference filter may differ" may refer to a filter coefficient of the reference filter, a number of filter taps, and filter intensity, or a number of filtering process may be differed.

In order to perform intra prediction, an intra-prediction mode of a current prediction unit may be predicted by an intra-prediction mode of a neighboring prediction unit that is adjacent to the current prediction unit. When the intra-prediction mode of the current prediction unit is predicted by using intra-prediction mode information of the neighboring prediction unit, and the both of the modes are identical, information that both of modes are identical may be transmitted by using a predetermined flag. Alternatively, when the modes are different, all prediction mode information within encoding/decoding target block may be encoded by entropy encoding.

Figure 7:
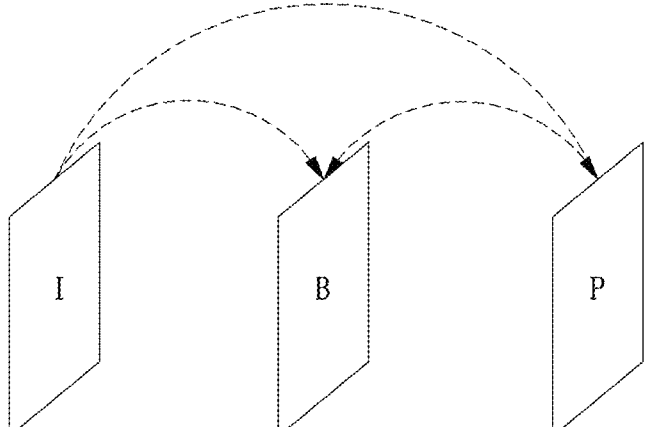
FIG. 7 is a diagram explaining an example of an inter-prediction process.

FIG. 7 is a diagram showing an example of an inter-prediction process.

A rectangle of FIG. 7 may refer to an image (or picture). In addition, arrows of FIG. 7 may indicate a prediction direction. In other words, the image may be encoded and/or is decoded according to the arrow directions. Each image may be classified into an I-picture (Intra picture), a P-picture (Uni-predictive Picture), and a B-picture (Bi-predictive Picture), etc. according to an encoding type. Each picture may be encoded and decoded according to an encoding type of each picture.

When an encoding target image is an I-picture, the target image itself may be intra-encoded while inter prediction is performed. When an encoding target image is a P-picture, the target image may be encoded by inter prediction using a reference image in a forward direction, or motion compensation. When an encoding target image is a B-picture, the target image may be encoded by inter prediction using reference pictures in a forward direction and in a reverse direction, or motion compensation. Alternatively, the target image may be encoded by inter prediction using a reference image in forward direction or in a reverse direction. Herein, in case of the inter-prediction mode, the encoder may perform inter prediction or the motion compensation, and the decoder may perform motion compensation in response to the encoder. Images of a P-picture and B-picture that are encoded and/or decoded by using a reference image are used for inter prediction.

Hereinbelow, inter prediction according to an embodiment is described in detail.

Inter prediction or motion compensation may be performed by using a reference image and motion information. In addition, inter prediction may use the skip mode described above.

The reference picture may be at least one of a previous picture of a current picture or a subsequent picture of the current picture. Herein, in inter prediction, a block of the current picture based on the reference picture may be predicted. Herein, an area within the reference picture may be specified by using a reference picture index refIdx indicating the reference picture and a motion vector that will be described later.

In inter prediction, a reference block that corresponds to the current block within the reference picture may be selected. A prediction block of the current block may be generated by using the selected reference block. The current block may be a current encoding or decoding target block among blocks of the current picture.

Motion information may be derived from an inter-prediction process of the encoding apparatus 100 and the decoding apparatus 200. In addition, the derived motion information may be used for inter prediction. Herein, the encoding apparatus 100 and the decoding apparatus 200 may improve efficiency of encoding and/or decoding by using motion information of a reconstructed neighboring block and/or motion information of a collocated block (col block). The collocated block may be a block that spatially corresponds to an encoding/decoding target block within a reconstructed collocated picture (col picture). The reconstructed neighboring block may be a block within the current picture and a reconstructed block through encoding and/or decoding. In addition, the reconstructed block may be a block adjacent to the encoding/decoding target block and/or a block positioned at an outer corner of the encoding/decoding target block. Herein, the block positioned at the outer corner of the encoding/decoding target block may be a block that is adjacent in a vertical direction, and the block adjacent in a vertical direction is adjacent to the encoding/decoding target block in a horizontal direction. Alternatively, the block positioned at the outer corner of the encoding/decoding target block may be a block that is adjacent in a horizontal direction, and the block adjacent in a horizontal direction is adjacent to the encoding/decoding target block in a vertical direction.

Each of the encoding apparatus 100 and the decoding apparatus 200 may determine a predetermined relative position based on a block that is present at a position spatially corresponding to the current block within the collocated picture. The predetermined relative position may be positioned at an inside and/or outside of the block that is present at the position spatially corresponding to the current block. In addition, the encoding apparatus 100 and the decoding apparatus 200 may derive the collocated block based on the determined relative position. Herein, the collocated picture may be at least one picture among reference pictures included in a reference picture list.

A method of deriving the motion information may vary according to a prediction mode of the encoding/decoding target block. For example, the prediction mode applied for inter prediction may include an advanced motion vector predictor (AMVP) mode, a merge mode, and the like. Herein, the merge mode may refer to a motion merge mode.

For example, in the case of applying the advanced motion vector predictor (AMVP) mode, the encoding apparatus 100 and the decoding apparatus 200 may generate a prediction motion vector candidate list by using a motion vector of the restored neighboring block and/or a motion vector of the collocated block. In other words, the motion vector of the restored neighboring block and/or the motion vector of the collocated block may be used as a prediction motion vector candidate. Herein, the motion vector of the collocated block may refer to a temporal motion vector candidate, and the motion vector of the restored neighboring block may refer to a spatial motion vector candidate.

The encoding apparatus 100 may generate a bitstream, and the bitstream may include a motion vector candidate index. In other words, the encoding apparatus 100 may entropy encode the motion vector candidate index to generate the bit stream. The motion vector candidate index may indicate an optimal prediction motion vector selected among the prediction motion vector candidates included in the motion vector candidate list. The motion vector candidate index may be transmitted from the encoding apparatus 100 to the decoding apparatus 200 through the bitstream.

The decoding apparatus 200 may entropy decode the motion vector candidate index through the bit stream, and select the motion vector candidate of the decoding target block among the motion vector candidates included in the motion vector candidate list by using the entropy decoded motion vector candidate index.

The encoding apparatus 100 may calculate a motion vector difference (MVD) between the motion vector of the encoding target block and the motion vector candidate, and may entropy encode the motion vector difference (MVD). The bitstream may include the entropy encoded MVD. The MVD is transmitted to the decoding apparatus 200 through the bitstream. Herein, the decoding apparatus 200 may entropy decode the MVD from the bitstream. The decoding apparatus 200 may derive the motion vector of the decoding target block through a sum of the decoded MVD and the motion vector candidate.

The bitstream may include a reference picture index indicating the reference picture. The reference picture index may be entropy encoded and transmitted from the encoding apparatus 100 to the decoding apparatus 200 through the bitstream. The decoding apparatus 200 may predict the motion vector of the current block by using the motion information of the neighboring block, and may derive the motion vector of the decoding target block by using the predicted motion vector and a residual value of the predicted the motion vector. The decoding apparatus 200 may generate the prediction block of the decoding target block based on the derived motion vector and the reference picture index information.

As another method of deriving the motion information, a merge mode may be used. The merge mode may refer to a motion merging of a plurality of blocks. The merge mode may also refer to applying motion information of a single block to another block. When the merge mode is applied, the encoding apparatus 100 and the decoding apparatus 200 may generate a merge candidate list by using the motion information of the restored neighboring block and/or the motion information of the collocated block. Herein, the motion information may include at least one of 1) the motion vector, the reference picture index, and 3) an inter-prediction indicator. The prediction indicator may indicate a uni-direction (LO prediction, L1 prediction), or a bi-direction.

Herein, the merge mode may be applied in a unit of a coding unit or a prediction unit (PU). In the case of performing the merge mode by the CU unit or the PU unit, the encoding apparatus 100 may generate a bitstream by entropy encoding predetermined information, and transmit the bitstream to the decoding apparatus 200. The bitstream may include the predetermined information. The predetermined information may include 1) a merge flag representing whether the merge mode is used for each block partition, 2) a merge index including information to which block among the neighboring blocks adjacent to encoding target block is merged. For example, neighboring blocks adjacent to encoding target block may include a left adjacent block of the current block, an upper adjacent block of the encoding target block, a temporally adjacent block of the encoding target block, and the like.

The merge candidate list may represent a list in which the motion information is stored. The merge candidate list may be generated before performing the merge mode. The motion information stored in the merge candidate list may be at least one of motion information of the neighboring block adjacent to the encoding/decoding target block, or motion information of the collocated block corresponding to the encoding/decoding target block in the reference picture, motion information newly generated by combining the motion information that is present in the merge motion candidate list in advance, and a zero merge candidate. Herein, the motion information of the neighboring block adjacent to the encoding/decoding target block may refer to a spatial merge candidate, and the motion information of the collocated block corresponding to the encoding/decoding target block in the reference picture may refer to a temporal merge candidate.

In the case of a skip mode, the skip mode applies the motion information of the neighboring block to the encoding/decoding target block. The skip mode may be one of other modes used in inter prediction. When the skip mode is used, the encoding apparatus 100 may generate a bitstream by entropy encoding information of the neighboring block that may be used for the encoding target block, and transmit the bit stream to the decoding apparatus 200. The encoding apparatus 100 may not transmit other information such as syntax information to the decoding apparatus 200. The syntax information may include at least one of residual information of the motion vector, an encoding block flag, and a transform coefficient level.

Hereinafter, an encoding/decoding method of an intra-prediction mode will be described with reference to FIGS. 8 to 15. Hereinafter, the intra-prediction mode is defined as an IPM. In the present invention, a secondary IPM (SIPM: Secondary IPM) and a secondary MPM (SMPM: Secondary MPM) are used in the same meaning.

Figure 8:
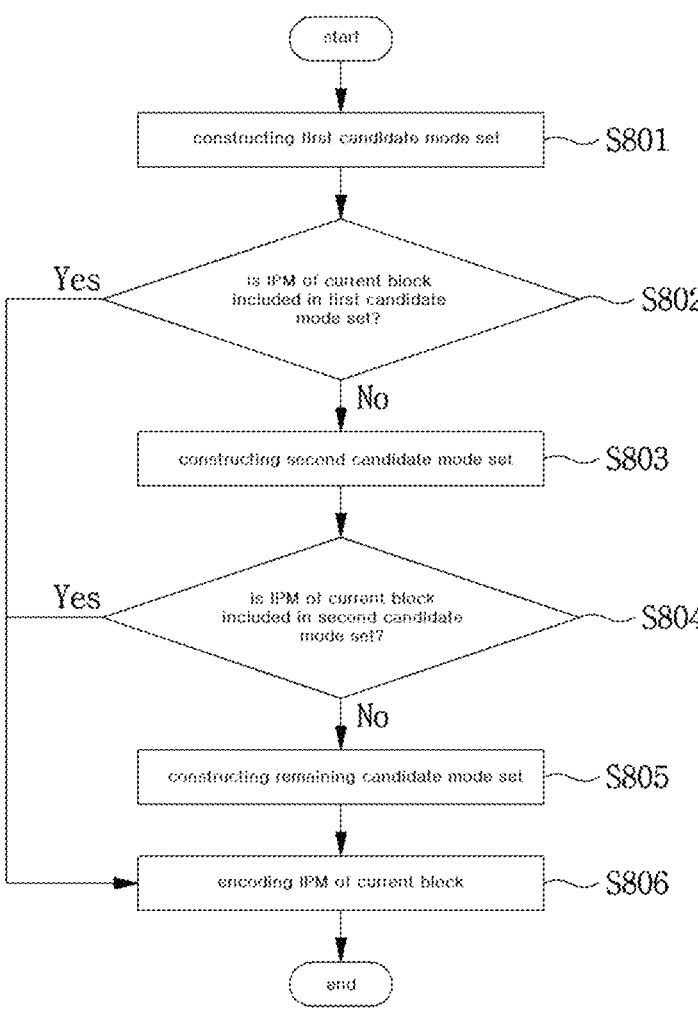
FIG. 8 is a flow chart explaining an encoding method of an intra-prediction mode according to an embodiment of the present invention.

FIG. 8 is a flow chart explaining an encoding method of an intra-prediction mode according to an embodiment of the present invention.

In step S801, the encoding method may construct a first candidate mode set. The first candidate mode set may include M (M is an integer equal to or greater than 1) candidate modes. The encoding method may perform the construction of the first candidate mode set based on an available intra-prediction mode of an upper and/or a left block adjacent to a current block.

In step S802, the encoding method may determine whether or not an intra-prediction mode of the current block is included in the first candidate mode set.

In step S806, when the intra-prediction mode of the current block is determined to be included in the first candidate mode set in step S802, the encoding method encodes the intra-prediction mode of the current block. Herein, the encoding method may encode information on the first determination result indicating that the intra-prediction mode of the current block is included in the first candidate mode set, and first indication information for indicating the same candidate mode as the intra-prediction mode of the current block among the M candidate modes included in the first candidate mode set.

The first candidate mode set including the M candidate modes may correspond to an MPM candidate mode set that will be described later. In addition, the information on the first determination result and the first indication information may respectively correspond to an MPM flag and an MPM index that will be described later.

When the intra-prediction mode of the current block is determined not to be included in the first candidate mode set in step S802, the encoding method may move to step S803.

In step S803, the encoding method may construct a second candidate mode set including N (N is an integer equal to or greater than 1) candidate modes. The encoding method may perform the construction of the second candidate mode set based on at least one reference prediction mode that is selected from the candidate modes included in the first candidate mode set.

In step S804, the encoding method may determine whether or not the intra-prediction mode of the current block is included in the second candidate mode set.

In step S806, when the intra-prediction mode of the current block is determined to be included in the second candidate mode set in step S804, the encoding method may encode information on the second determination result indicating that the intra-prediction mode of the current block is included in the second candidate mode set and second indication information for indicating the same candidate mode as the intra-prediction mode of the current block among the N candidate modes included in the second candidate mode set. Alternatively, the encoding method may encode the information on the first determination result together.

The second candidate mode set including the N candidate modes may correspond to a second IPM candidate (candidate mode set) that will be described later. In addition, the information on the second determination result and the second indication information may respectively correspond to a second MPM flag (secondary MPM flag) and a second MPM index (secondary MPM index) that will be described later.

When the intra-prediction mode of the current block is determined not to be included in the second candidate mode set in step S804, the encoding method may move to step S805.

In step S805, the encoding method may construct a remaining candidate mode set including remaining modes that are not included in both the first and second candidate mode sets. Herein, in step S806, the encoding method may encode information indicating that the intra-prediction mode of the current block is not included in both the first and second candidate mode sets, and third indication information indicating the same candidate mode as the intra-prediction mode of the current block among the intra prediction modes included in the remaining candidate mode set. The information indicating that the intra-prediction mode of the current block is not included in both the first and second candidate mode sets may be encoded by using the information on the first determination result and the information on the second determination result.

The third indication information may correspond to an IPM index (rem_intra_luma_pred_mode) that will be described later.

When encoding the IMP of the current block, the encoding method may perform at least one additional decision step besides the steps S802 and/or S804. The encoding method may perform the additional decision step in an arbitrary order between the steps S801 to S806. The encoding method may perform the additional decision step based on at least one of the IPM of the current block, IPM(s) of neighboring block(s), a sample value of the current block, sample value(s) of the neighboring block(s), statistics of the IPMs of neighboring blocks such as distribution, an average value, a median value, a distribution value, a norm value, etc., a variation amount of the sample value of the current block and/or the neighboring blocks, IPM value(s) included in the first candidate mode set, and IPM value(s) included in the second candidate mode set. Alternatively, the encoding method may determine whether or not the IPM of the current block is included in an n-th candidate mode set in the additional decision step when 3 or more candidate mode sets are provided. When 3 or more candidate mode sets are provided, the encoding method shown in FIG. 8 may include construct the n-th candidate mode set. Herein, n is an integer equal to or greater than 3.

Figure 9:
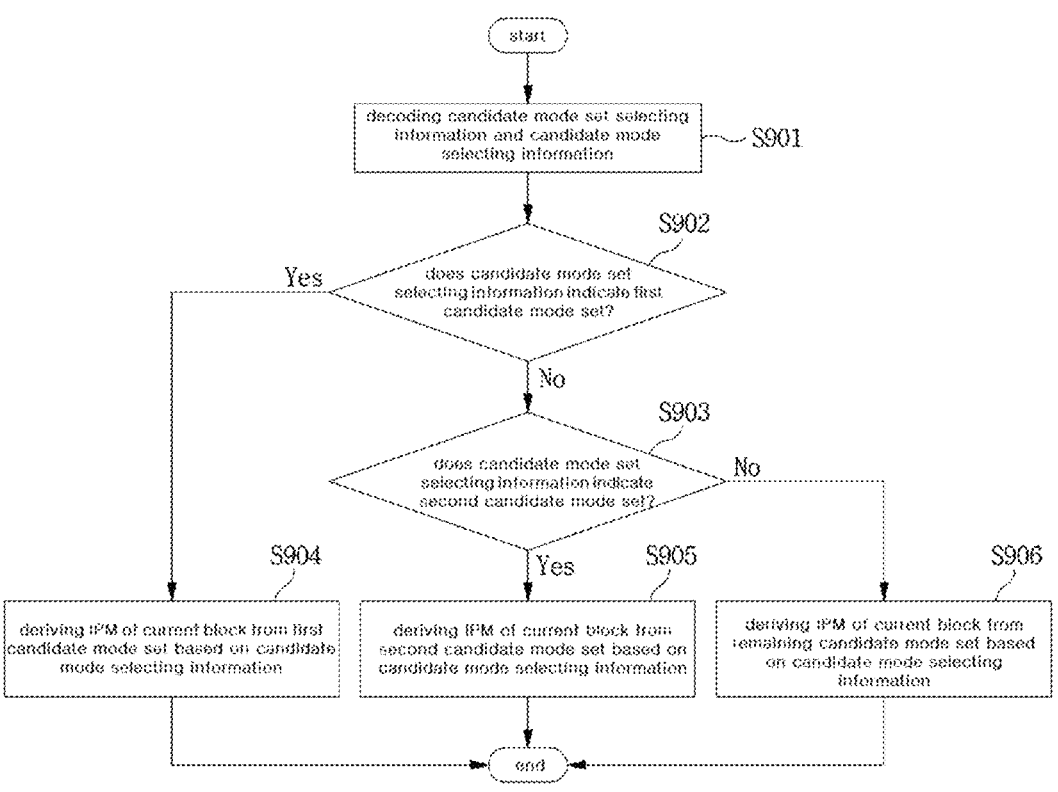
FIG. 9 is a flow chart explaining a decoding method of an intra-prediction mode according to an embodiment of the present invention.

FIG. 9 is a flow chart explaining a decoding method of an intra-prediction mode according to an embodiment of the present invention.

In step S901, the decoding method may decode candidate mode set selecting information and candidate mode selecting information. The candidate mode set selecting information may include first candidate mode set selecting information and/or second candidate mode set selecting information. The candidate mode set selecting information may correspond to the information on the first determination result and/or the information on the second determination result explained with reference to FIG. 8. The candidate mode set selecting information may be decoded from a single syntax element or from multiple syntax elements. Descriptions of the first candidate mode set and the second candidate mode set may be the same as described with reference to FIG. 8. The candidate mode selecting information may be information for selecting one mode among the candidate modes included in the candidate mode set. The candidate mode selecting information may correspond to the first, second, and/or third indication information explained with reference to FIG. 8. The candidate mode selecting information may be an index indicating one candidate mode among the candidate modes included in the candidate mode set. Alternatively, the candidate mode selecting information may be information directly indicating an intra-prediction mode of a current block.

In step S902, the decoding method may determine whether or not the candidate mode set selecting information indicates the first candidate mode set. When the candidate mode set selecting information indicates the first candidate mode set (YES), the first candidate mode set may be used for decoding the intra-prediction mode of the current block.

In step S904, when the candidate mode set selecting information indicates the first candidate mode set, the decoding method may derive the intra-prediction mode of the current block from the first candidate mode set based on the candidate mode selecting information.

In step S903, when the candidate mode set selecting information does not indicate the first candidate mode set (NO) in step S902, the decoding method may determine whether or not the candidate mode set selecting information indicates the second candidate mode set. When the candidate mode set selecting information indicates the second candidate mode set (YES), the second candidate mode set may be used for decoding the intra-prediction mode of the current block.

In step S905, when the candidate mode set selecting information indicates the second candidate mode set, the decoding method may derive the intra-prediction mode of the current block from the second candidate mode set based on the candidate mode selecting information When the candidate mode set selecting information does not indicate the second candidate mode set (NO) in step S903, a remaining candidate mode set that is not included in both the first and second candidate mode sets may be used for decoding the intra-prediction mode of the current block.

In step S906, when candidate mode set selecting information does not indicate the second candidate mode set (NO) in step S903, the decoding method may derive the intra-prediction mode of the current block from the remaining candidate mode set based on the candidate mode selecting information.

When decoding the IPM of the current block, the decoding method may perform at least one additional decision step besides the steps S902 and/or S903. The decoding method may perform the additional decision step in an arbitrary order between the steps S901 to S904 or between the steps S905 or S906. The decoding method may perform the additional decision step based on at least one of the IPM of the current block, IPM(s) of neighboring block(s), a sample value of the current block, sample value(s) of the neighboring block(s), statistics of the IPMs of neighboring blocks such as distribution, an average value, a median value, a distribution value, a norm value, etc., a variation amount of the sample value of the current block and/or the neighboring blocks, IPM value(s) included in the first candidate mode set, and IPM value(s) included in the second candidate mode set. Alternatively, the decoding method may determine whether or not the IPM of the current block is included in an n-th candidate mode set in the additional decision step when 3 or more candidate mode sets are provided. When 3 or more candidate mode sets are provided, the decoding method shown in FIG. 9 may include constructing the n-th candidate mode set. Herein, n is an integer equal to or greater than 3.

An encoding/decoding method of an intra-prediction mode according to the present invention is described in detail.

The encoding/decoding method of the intra-prediction mode may be performed by using at least one of a method based on an MPM that will be described later, a method based on a secondary IPM (SIPM: Secondary IPM), and a method based on a remaining intra-prediction mode except for the MPM and/or the SIPM. However, it is not limited to the secondary IPM, a third or more MPM candidate mode set may be used by considering a total number of predefined intra-prediction modes in the encoder/decoder, a range of an intra-prediction modes which can be used by an encoding/decoding target block, etc.

1. The encoding/decoding method of the intra-prediction mode based on the MPM.

Figure 10:
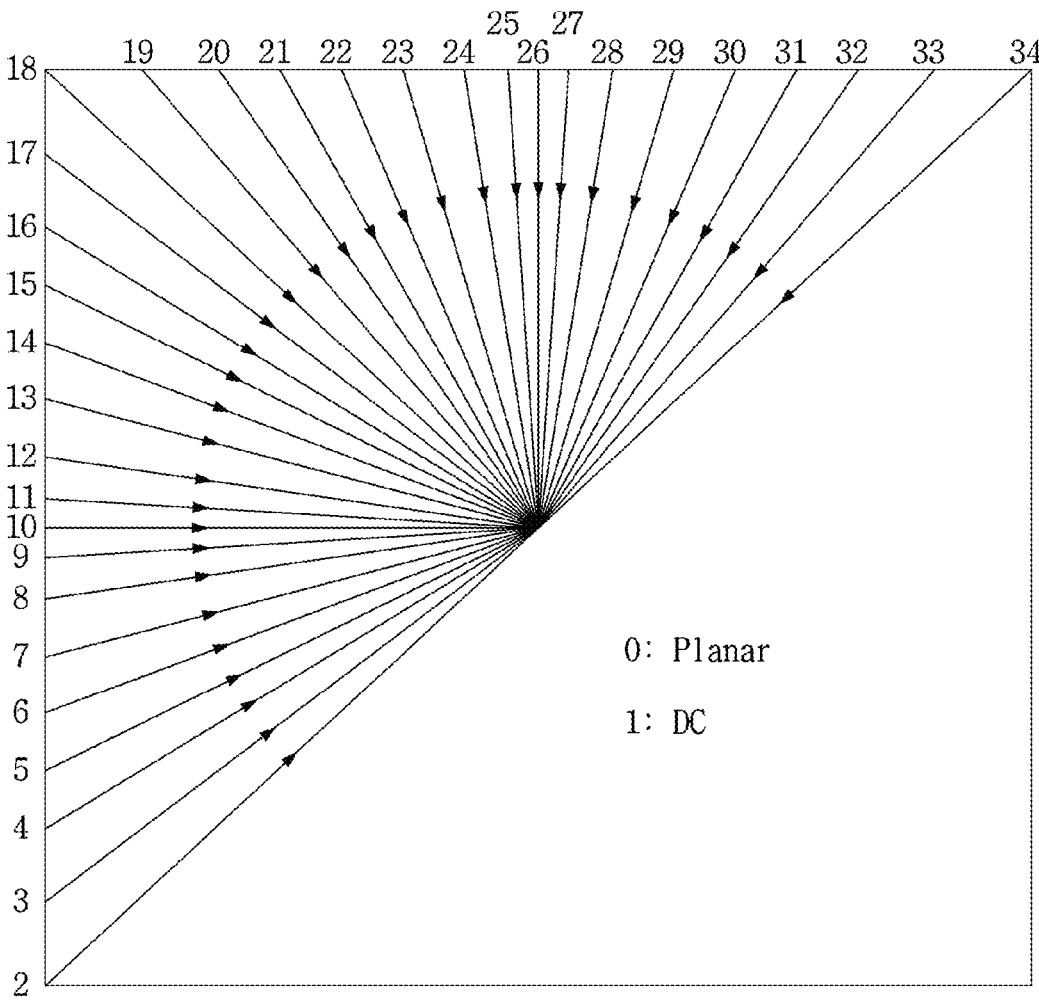
FIG. 10 is a diagram explaining intra-prediction modes in which up to 35 intra-prediction modes are supported as the intra-prediction mode of an image.

A. Up to T (T is a positive integer greater than 0) intra-prediction modes may be supported for intra prediction. Herein, T may be an integer more than 35 (for example, 67). Hereinafter, for convenience of explanation, T is assumed to be 35. The intra-prediction mode using greater than 35 intra-prediction modes may be similarly or identically encoded/decoded by the method that will be described below. In one embodiment, two non-angular modes and 33 angular modes may be supported as depicted in FIG. 10 when up to 35 intra-prediction modes are supported.

The two non-angular modes may be a planar mode and a DC mode, and IPM indexes thereof may be set to 0 and 1, respectively. The 33 angular modes are as shown in FIG. 10, IPM indexes thereof may be set to 2~34, respectively.

B. In order to transmit an intra prediction mode determined at the encoder, an encoding method based on MPM (Most probable mode) derived from an neighboring intra-prediction block that is previously encoded/decoded may be used first.

(1) Prediction modes of neighboring intra-prediction blocks are obtained as MPM candidates. The neighboring intra-prediction blocks may include at least one of a left block, an upper block, or a corner block of a current block. When obtaining the left intra-prediction block and/or the upper intra-prediction block based on the current block, the intra-prediction mode of the block with the highest occurrence frequency among the neighboring intra-prediction blocks based on a size of the current block may be obtained, or the intra-prediction mode of the block that is placed just to the left part and upper part based on the current block may be obtained.

(2) When the intra-prediction modes obtained from the left part and the upper part based on the current block are different, the MPM candidates may be constructed up M (M<T, M is a positive integer greater than 0) candidates. In one embodiment, when M is 3, indexes of the MPM candidates may be assigned as follows.

MPM[0]=Left_IPM,MPM[1]=Above_IPM,
      MPM[2]=Planar/DC/Vertical (Herein, in case of MPM[2], MPM[0] or MPM[1] may be same as Planar, DC and Vertical. Therefore, after determining whether to duplicate, another IPM may be assigned to MPM[2] according to a predetermined order (Planar→DC→Vertical).)

(3) When the intra-prediction modes obtained from the left part and the upper part based on the current block are identical.

When the two identical modes are planar modes or DC modes, indexes of the MPM candidates may be set as follows. MPM[0]=Planar, MPM[1]=DC, MPM[2]=Vertical. Alternatively, when the two identical modes are angular modes (IPM=2~34), indexes of the MPM candidates may be set as follows. MPM[0]=Left_IPM, MPM[1]=Left_IPM-1, MPM[2]=Left_IPM+1.

(4) In case of the MPM[2] of (2) and (3), except for the above embodiment, the MPM[2] may be assigned to an arbitrary intra-prediction mode different an intra prediction mode obtained from a neighboring block.

C. When binarizing the up to T intra-prediction modes, at least one entropy encoding method among various entropy encoding methods may be used for encoding the corresponding information.

In one embodiment, when encoding IPM information including 35 intra-prediction modes by using fixed length coding (FLC), up to 6 bits are required to binarize the IPM. However, minimum 3 bits or maximum 6 bits are encoded by encoding based on an MPM that uses an IPM correlation of neighboring blocks. Herein, when a number of MPMs is M, M may be equal to or less than T. When M is set to 3.

(1) When the current IPM matches to one of the three candidate modes included in the MPM, the IPM may be binarized by using 3 bits. (Flag information (MPM flag, 1 bit) indicating that the current IPM of a current encoding unit matches to one of the three candidate modes included in the MPM, and index information (MPM index, 2 bit) indicating one mode among the three candidate modes.)

(2) When the current IPM does not match to any one of the three candidate modes included in the MPM, the IPM may be binarized by using 6 bits. (Flag information (MPM flag, 1 bit) indicating that the current IPM of the current encoding unit does not match to any one of the three candidate modes included in the MPM and index information (MPM index, 5 bit) indicating the IPM of the current encoding unit among the remaining 32 IPMs excluding the three MPM modes out of a total of 35 IPM modes.)

(3) When the MPM is actually selected according to the above embodiment method, a number of bits may be reduced when encoding using an FLC code word since the candidate mode of the MPM is binarized by 3 bits instead of 6 bits (4) The above embodiments follow binarization steps while encoding using FLC code word. The IPM may be binarized by using at least one of various entropy encoding methods used in video standards.

D. The flag and index information described above may use at least one of the following entropy encoding methods. After being binarized, the flag and index information may be finally encoded in CABAC(ae(v)).

a truncated rice binarization method a K-th order Exp_Golomb binarization method a restricted K-th order Exp_Golomb binarization method a fixed-length binarization method a unary binarization method a truncated unary binarization method A decoder may construct M (for example, 3, 4, 5, 6, etc.) MPM candidate modes by obtaining neighboring IPM values similarly as the encoder does.

When the IPM of the current block is identical to at least one of the MPM candidate modes according to a decoded value of the MPM flag described above, the decoder may obtain an IPM value necessary for current decoding among the MPM candidate modes by using the MPM index.

When the IPM of the current block is not identical to any one of the MPM candidate modes according to the decoded value of the MPM flag described above, the decoder may obtain the IPM value necessary for current decoding among the MPM candidate modes by using the IPM index.

In one embodiment, when the total number of the intra-prediction modes are 35 and the number of the MPM candidates modes are 3, and when the IPM of the current block is not included in the MPM candidate modes, an IPM index value has a value range from 0~31. However, the IPM index value needs to be revised since the IPM index value is not an actual IPM value of a current decoding unit. For example, when 3 MPM candidate modes actually have angular modes 3, 25, and 28 and the IPM of the current decoding block has a mode 17, the IPM index (0~31) may be constructed as the following table that does not include the 3 MPM candidate modes, and the encoder may transmit by entropy encoding the IPM index that corresponds to mode 16.

As shown in table 1, the decoder may construct a revised IPM table (Revised (Rev.) IPM Table) in which the actual IPM value that matches to the IPM index is reflected. Therefore, the decoder may derive the IPM value (17) of the currently decoded intra-prediction block by using the table 1. Herein, the decoder may not construct the table when decoding, but obtain the IPM index value (16) and sorting corresponding MPM candidate values (3, 25, and 28) in ascending order, and obtain the IPM value of the current block by increasing by 1 when the current decoded IPM index value is greater than the MPM candidate value. Therefore, since the current IPM index value that is 16 is larger that only one (3) of the three MPM candidates, an original IPM value that is 17 may be obtained by increasing the current IPM index value by 1 (16+1=17).

TABLE 1

| IPM Mode | Rev. IPM mode | IPM index |
|---|---|---|
| 0 | 0 | 0 |
| 1 | 1 | 1 |
| 2 | 2 | 2 |
| 3 (MPM candidate) | 4 | 3 |
| 4 | 5 | 4 |
| — | — | — |
| — | — | — |
| 16 | 17 | 16 (transmitted index value) |
| 17 (Actual IPM) | 18 | 17 |
| — | — | — |
| — | — | — |
| 24 | 26 | 24 |
| 25(MPM candidate) | 27 | 25 |
| 26 | 29 | 26 |
| 27 | 30 | 27 |
| 28(MPM candidate) | 31 | 28 |
| 29 | 32 | 29 |
| 30 | 33 | 30 |
| 31 | 34 | 31 |
| 32 | — | — |
| 33 | — | — |
| 34 | — | — |

2. The encoding/decoding method of the intra-prediction mode based on the secondary IPM.

[Step 1] An encoder may encode by using a secondary MPM by generating a secondary intra-prediction candidate mode list including N candidate modes when an intra-prediction mode of a current encoding intra block is not identical to any one of M candidate modes of an MPM.

Herein, the generated N secondary IPM candidate modes include another prediction mode different from M MPM candidate modes.

The encoder and decoder may have same number of generated N secondary IPM candidate modes. The number N may be an arbitrary positive integer and may be set to be equal to or smaller than a total number of the intra-prediction modes-M.

In one embodiment, the number of N secondary IPM candidate modes may be 4. When an intra-prediction mode of a current encoding intra-prediction mode is identical to one of the secondary IPM candidate modes, and the current encoding intra-prediction mode is binarized by FLC code-word, the current encoding intra-prediction mode may be expressed as 4 bits. (MPM flag(1 bit, "0")+Secondary MPM flag(1 bit, "1")+SMPM index(2 bits).

In one embodiment, the number of N secondary IPM candidate modes may be 16. When the intra-prediction mode of the current encoding intra-prediction mode is identical to one of the secondary candidate modes, and the current encoding intra-prediction mode is binarized by FLC code-word, the current encoding intra-prediction mode may be expressed as 6 bits. (MPM flag(1 bit, "0")+Secondary MPM flag(1 bit, "1")+SMPM index(4 bit)).

The number of candidate modes and which candidate modes to be included in the secondary IPM candidate modes may be determined according to various encoding parameters (for example, pre-defined intra-prediction related syntax, encoding parameter, size of current encoding unit, prediction unit and transform unit, information whether or not the encoding unit is partitioned, M MPM candidate modes and an intra-prediction mode of neighboring block that is not included in MPM).

The number of the secondary IPM candidate modes and whether or not the secondary IPM candidate mode is used may be entropy encoded/decoded in at least one of a video parameter set, a sequence parameter set, a picture parameter set, an adaptation parameter set, a slice header, a coding unit, a prediction unit, and a transform unit, or may be implicitly set in the encoder/decoder according to the same method. Alternatively, while entropy encoding/decoding the at least one of the above information, at least one of the following binarization methods may be used:

a truncated rice binarization method a K-th order Exp_Golomb binarization method a restricted K-th order Exp_Golomb binarization method a fixed-length binarization method a unary binarization method a truncated unary binarization method The above method is not limited to using the secondary IPM candidate modes besides the MPM, and flag information and intra-prediction mode information may be encoded/decoded according to the above method by forming a third or more IPM candidate mode group.

The secondary IPM candidate modes may be constructed according to various methods that will be described below. The encoder may determine an arbitrary secondary IPM candidate mode based on the following various methods. The decoder may derive the secondary IPM candidate modes according to the predefined rule as the encoder does.

When the number of the secondary IPM candidate modes is N, within the allowed number, intra-prediction modes other than the existing MPM candidate modes may be included in the secondary IPM candidate modes. The secondary IPM candidate modes may be obtained by sub-sampling N candidate modes from the entire intra-prediction modes except for the MPM candidate modes. Herein, for the N secondary IPM candidate modes, corresponding index values from 0 to N−1 which are not the unique intra-prediction mode values may be encoded.

(1) The secondary IPM candidate modes may be constructed including a mode having a high occurrence frequency of being selected as the intra-prediction mode.

In general, intra-prediction modes of a planar mode, DC mode, vertical mode, horizontal mode, diagonal angular mode may be included in the secondary IPM candidate modes since they have a high probability to be selected when a current block is homogeneous or an edge component of the current block for the diagonal angle is strong.

Figure 11:
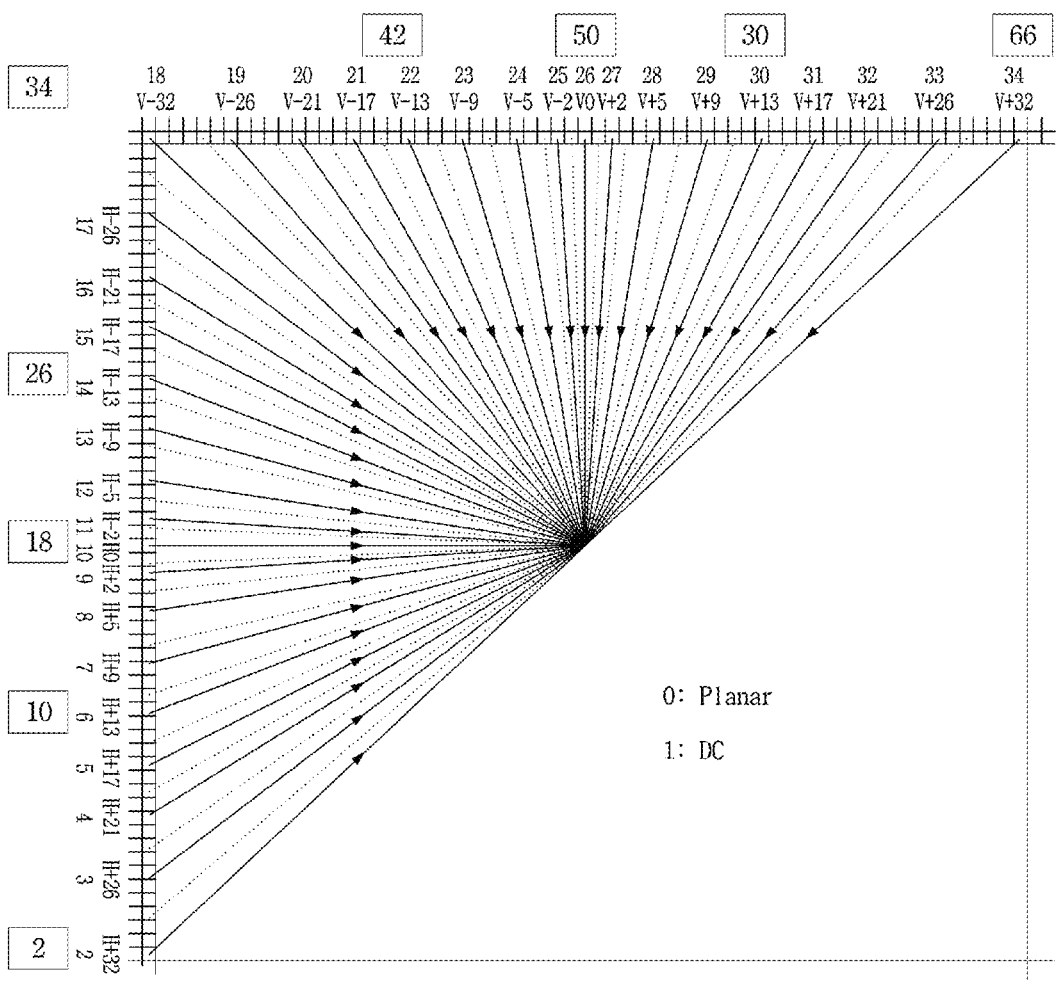
FIG. 11 is a diagram explaining intra-prediction modes in which up to 67 intra-prediction modes are supported as the intra-prediction mode of an image.

For example, when 35 intra-prediction modes are supported, in FIG. 11, intra-prediction indexes for vertical, horizontal, diagonal angular modes may correspond to 26, 10, 18, and 34, respectively. When 67 intra-prediction modes are supported, intra-prediction indexes for vertical, horizontal, diagonal angular modes may correspond to 50, 18, 34, and 66, respectively. Herein, intra-prediction indexes for a planar mode and DC mode may correspond to 0, and 1, respectively in common.

(2) When the M candidate modes included in the MPM are constructed with at least one angular mode except for the planar mode and the DC mode, the secondary IPM candidate modes may be constructed by using neighboring modes of the corresponding angular modes.

In one embodiment, when one angular mode is included in the M MPM candidate modes and an index of the angular mode is K, the secondary IPM candidate modes may be constructed including up to N candidate modes such as K−1, K+1, K−2, K+2, . . . .

In one embodiment, when two angular modes L and A are included in the M MPM candidate modes, as described above, the secondary IPM candidate modes may be constructed including L−1, L+1, L−2, L+2 . . . and A−1, A+1, A−2, A+2, . . . . Alternatively, the secondary IPM candidate modes may be constructed including up to N candidate modes that are modes corresponding to a maximum value (Max), a minimum value (Min), an average value (Avg), a median value (Median) of the two angular modes and/or neighboring modes of the above derived modes such as Max−1, Max+1, Max−2, Max+2 . . . or Min−1, Min+1, Min−2, Min+2, . . . or Avg−1, Avg+1, Avg−2, Avg+2, . . . .

In one embodiment, when S number of different angular modes are included in the M MPM candidate modes, herein S<=M, the secondary IPM candidate modes may be constructed including neighboring modes of each angular mode or intra-prediction modes corresponding to a maximum value, a minimum value, an average value, a median value of the angular modes. Herein, orders constructing the secondary IPM candidate modes may be made freely; however, the encoder/decoder may follow the same order, and the number of the secondary IPM candidate modes cannot exceed N.

As described above, when deriving neighboring modes by using angular mode information of the MPM candidate modes, each has to have a different intra-prediction mode. For example, when Max−1 and Min+1 are identical modes, then only one of the two may be included in the secondary IPM candidate modes. Intra-prediction modes constructed including values calculated by adding/subtracting (for example, Min−1, Min+1, Max+1, Max+2, etc.) may be replaced to another mode when the calculated values exceed an intra-prediction mode index range. (In FIG. 11, when 67 intra-prediction modes are supported and Max+2 is greater than 66, an intra-prediction mode 2 or an intra-prediction mode more than 2 may be included in the secondary IPM candidate modes.)

(3) The secondary IPM candidate modes may include up to N candidate modes according to intra-prediction modes that have high occurrence frequency by deriving statistics of actual intra prediction modes encoded in a previously encoded picture or slice.

(4) The secondary IPM candidate modes may be derived by sub-sampling up to N candidate modes from the intra-prediction modes except for the intra-prediction modes included in the MPM candidate modes according to MPM construction information (for example, information on intra prediction mode included in MPM (angular mode), information about whether or not an identical intra-prediction mode occurs, distribution of intra-prediction mode indexes included in the MPM, error between a prediction block according to an angle and a reconstructed neighboring reference sample, etc.)

In one embodiment, when 67 intra-prediction modes (planar mode, DC mode and 65 angular modes) are supported for intra prediction, 6 MPM modes and 16 secondary IPM candidate modes may be constructed according to the following criteria. Herein, distribution of intra-prediction modes of the MPM within the entire intra-prediction modes may be as shown in FIG. 12. In the above criteria, L and A may be obtained from intra-prediction modes that have the highest occurrence frequency in a left block and an upper block based on a current block and are already encoded. Max and Min represent a maximum value and a minimum value of L and A as described above.

The left-most column of FIG. 12 corresponds to values indicating intra-prediction modes. Angular modes (2~66) among the intra-prediction modes are represented in a light gray color, and non-angular modes O (planar mode) and 1 (DC mode) are represented in a white color.

The second column to the last column of FIG. 12 correspond to various cases (Case 1~Case 6) that select the MPM candidate mode based on L and A. According to each column, the selected MPM candidate mode is represented in a light gray color.

The first case (Case 1) of FIG. 12 is L=A (represented in C); however, the corresponding modes are neither planar modes nor DC modes. Herein, 6 MPM candidate modes may include C, planar, C+1, C−1, C+2, and DC modes.

The second case (Case 2) of FIG. 12 is L=A (represented in C); however, the corresponding modes are planar modes or DC modes. Herein, 6 MPM candidate modes may include planar, DC, vertical (50), horizontal (18), 2, and 34 modes.

The third case (Case 3) of FIG. 12 is L!=A; however, neither of the corresponding modes is a planar mode, but one of the two is a DC mode. Herein, 6 MPM candidate modes may include L, A, Planar, Max−1, Max+1, and Max+2 modes.

The fourth case (Case 4) of FIG. 12 is L!=A; however, neither of the corresponding modes is a planar mode or DC modes. Herein, 6 MPM candidate modes may include L, A, Planar, DC, Max+1, and Min−1 modes.

The fifth case (Case 5) of FIG. 12 is L!=A, one of the corresponding modes is a planar mode and the other is a DC mode. Herein, 6 MPM candidate modes may include L, A, vertical (50), horizontal (18), 2, and 34 modes.

The sixth case (Case 6) of FIG. 12 is L!=A, one of the corresponding modes is a planar mode and the other is not a DC mode. Herein, 6 MPM candidate modes may include L, A, DC, Max−1, Max+1, and Max+2 modes.

The sub-sampling for constructing the secondary IPM candidate modes may be performed using at least intra-prediction mode included in the MPM candidate modes as a reference prediction mode. Herein the reference prediction mode may be a predetermined positional angular mode among the intra-prediction mode included in the MPM. Alternatively, it may be one or more angular modes among the intra-prediction mode included in the MPM. At least one of a minimum value, a maximum value, an average value, a median value of angular modes or an intra-prediction mode derived from neighboring prediction blocks (L or A) may be set to the reference prediction mode. Alternatively, the sub-sampling may be performed by setting at least one of the intra-prediction modes except for the MPM candidate modes as the reference prediction mode. In one embodiment, a minimum value among the remaining intra-prediction modes may be set as the reference prediction mode.

Figure 13:
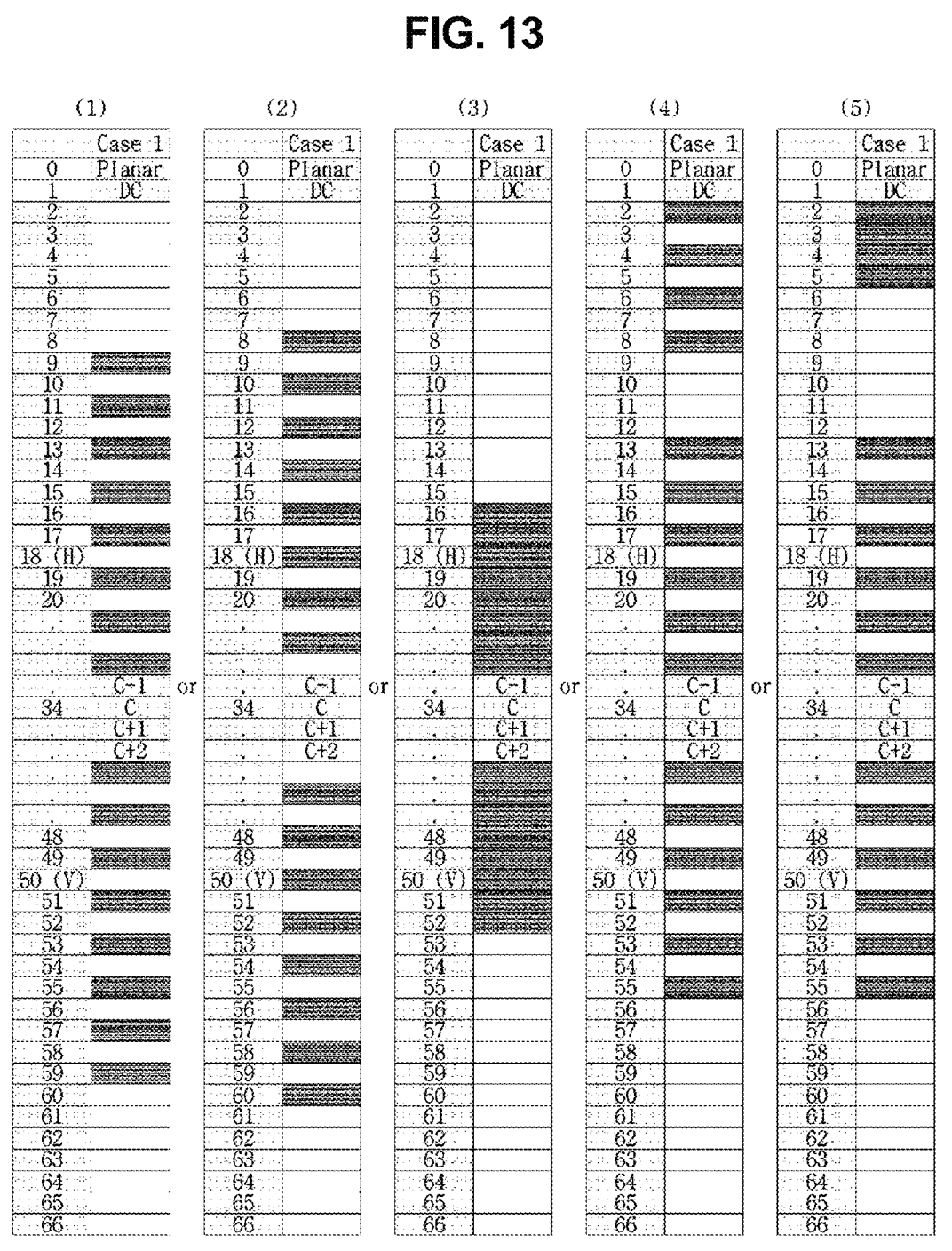

FIG. 13 is a diagram explaining various embodiments constructing the secondary IPM candidate modes based on the construction of the MPM candidate modes according to the first case of FIG. 12.

In FIG. 13, 0~66 are indexes of 67 intra-prediction modes. Herein, 0 and 1 may represent a planar mode and a DC mode. The secondary IPM candidate modes are set to 16 candidate modes. In addition, according to the first case of FIG. 12, the MPM candidate modes are represented in a light gray color. In addition, modes that are selected as the secondary IPM candidate modes are represented in a dark gray color.

In the first case of FIG. 12, an intra-prediction mode derived from the left and upper part has a single angular mode (C), and in order to construct the MPM candidate modes having M modes (6 modes in the present embodiment), planar, C+1, C−1, C+2, DC modes are added to the MPM candidate modes. Herein, a reference prediction mode of the sub-sampling to construct N secondary IPM candidate modes may be the angular mode C. In other words, the N secondary IPM candidate modes may be sub-sampled according to following various embodiments based on C−1 and C+2.

In one embodiment, in order to construct 16 secondary IPM candidate modes except for the 6 MPM candidate modes, the same number (N/2) of intra-prediction modes that are smaller than C−1 and intra-prediction modes that are greater than C+1 may be selected, or may be selected in different numbers. In addition, while performing sub-sampling, an index interval may be set to 2 as shown in FIGS. 13(1) and 13(2). Alternatively, the index interval may be set to 1 as shown in FIG. 13(3). Alternatively, the secondary IPM candidate modes may be constructed with a bigger interval.

In one embodiment, a part of the secondary IPM candidate modes may be constructed by using the above method, and a part of the remaining secondary IPM candidate modes may be constructed with intra-prediction modes adjacent to a planar mode and a DC mode. FIGS. 13(4) and 13(5) are examples in which 4 intra-prediction modes that are adjacent to the planar and DC modes and the rest 12 intra-prediction modes that are adjacent to the angular modes are used to construct the secondary IPM candidate modes. Herein, in configurations shown in FIGS. 13(4) and 13(5), index intervals of intra prediction modes neighboring the planar mode and the DC mode may be set to 1, 2, or more as described above.

The N secondary IPM candidate modes may be constructed with prediction mode values that are different from each other. When prediction mode values are saturated, the corresponding value may be replaced with another value. For example, when an intra-prediction mode having an arbitrary value greater than C+2 in FIG. 13(1) is obtained as the secondary IPM candidate mode and the arbitrary value exceeds 66, then the arbitrary value may be changed in another intra-prediction mode having a smaller value than 66, or may be changed in an intra-prediction mode with a value bigger than 2. Alternatively, when an intra-prediction mode having an arbitrary value smaller than C−1 is obtained as the secondary IPM candidate mode and the arbitrary value is smaller than 2, the intra-prediction mode may be changed to an intra-prediction mode with a value of 2 or bigger than 2, or with a value smaller than 66.

Distributions of MPM candidate modes of Case 3 and Case 6 shown in FIG. 12 are identical to that of Case 1. Therefore, the N secondary IPM candidate modes may be constructed by using the method described above.

When an intra-prediction mode of a current encoding block is identical to one of the N secondary IPM candidate modes, the N secondary IPM candidate modes may be indexed as 0, 1, 2, . . . , N−1, and the index value of the N secondary IPM candidate modes indicating the same intra prediction mode value as the current intra-prediction mode may be transmitted.

In one embodiment, while defining indexes for the N secondary IPM candidate modes in FIG. 13, the secondary IPM candidate mode that is smaller than C−1 or greater than C+2 may be indexed in turn from 0 to N−1.

In one embodiment, while defining indexes for the N secondary IPM candidate modes selected in FIG. 13, the N secondary IPM candidate modes may be indexed from 0 to N−1 according to an ascending order or a descending order based on unique values of intra-prediction modes according to an angle.

In one embodiment, while defining indexes for the N secondary IPM candidate modes selected in FIG. 13, the secondary IPM candidate modes selected in neighbors of planar/DC modes are indexed first and the remaining secondary IPM candidate modes may be indexed in an arbitrary order.

In addition to the above embodiment, the secondary IPM candidate modes may be indexed from 0 to N−1 according to encoding parameter information or a method that is identically derived in the encoder/decoder.

FIG. 14 is a diagram explaining an example of constructing the N secondary IPM candidate modes based on Case 2 or Case 5 of FIG. 12. In FIG. 14, modes represented in a light gray color correspond to modes that are determined as MPM candidate modes, and modes represented in a dark gray color correspond to the secondary IPM candidate modes.

In the Case 2 and Case 5 of FIG. 12, intra-prediction modes derived from a neighbor are planar and DC modes. Herein, since there is no angular information, vertical (50), horizontal (18), and diagonal (2, and 34) modes are included in the MPM candidate modes based on 67 intra-prediction mode indexes.

Herein, in order to construct the N secondary IPM candidate modes, intra-prediction mode values that are adjacent to the pre-selected MPM intra-prediction modes may be selected.

In one embodiment, in order to construct 16 secondary IPM candidate modes, as the Case 1, the 16 secondary IPM candidate modes may include intra-prediction modes having the same numbers or having different numbers around the MPM candidate modes, or may be sub-sampled by applying an arbitrary index interval (1 or 2). Herein, the sub-sampling method for constructing the secondary IPM candidate modes may be performed by using various methods as in the Case 1 described above. In this case, the entire prediction modes shall be different from each other and the maximum number shall not exceed the number N.

When an intra-prediction mode of a current encoding block is identical to one of the secondary MPM candidate modes, the N secondary MPM candidate modes may be indexed as 0, 1, 2, . . . , N–1 as described above.

FIG. 15 is a diagram explaining an example of constructing the N secondary IPM candidate modes based on Case 4 of FIG. 12. In FIG. 15, modes represented in a light gray color correspond to modes that are determined as MPM candidate modes, and modes represented in a dark gray color correspond to the secondary IPM candidate modes.

In Case 4 shown in FIG. 12, neighboring intra-prediction modes (L, A) are angular modes that are different from each other, and thus the N secondary IPM candidate modes may be constructed with neighboring intra-prediction modes that are adjacent to the corresponding angular modes.

Herein, in order to construct the N secondary IPM candidate modes, intra-prediction modes that are adjacent to the pre-selected MPM based prediction modes may be selected.

In one embodiment, in order to construct 16 secondary IPM candidate modes, intra-prediction modes having the same numbers or having different numbers around angular prediction modes included in the MPM may be sub-sampled. Alternatively, as in the Case 1, the entire 16 number of the secondary IPM candidate modes may be constructed with a part using neighboring intra-prediction modes of two different intra-prediction modes, and the other part using intra-prediction modes neighboring a planar mode or a DC mode.

When the intra-prediction mode of the current encoding block is identical to one of the secondary MPM candidate modes, the N secondary MPM candidate modes may be indexed as 0, 1, 2, . . . , N–1 as described above.

The N secondary IPM candidate modes may be sub-sampled according to distribution and features of the MPM as the above embodiments. Alternatively, the N secondary IPM candidate modes may be sub-sampled according to an arbitrary index interval by sorting the remaining intra-prediction modes, except for the MPM candidate modes, in an ascending order or in a descending order. Herein, the arbitrary index interval may be a positive integer equal to or bigger than 1.

In one embodiment, when 67 intra-prediction modes are supported and 6 MPM candidate modes are included therein, 61 intra-prediction modes, except for the 6 MPM candidate modes, are sorted in an ascending order or in a descending order based on unique angular values thereof. The 61 sorted intra-prediction modes may respectively have indexes range from 0 to 60. The N secondary IPM candidate modes may be constructed according to an arbitrary index interval. Herein, the intra-prediction modes may be identically sorted in an encoder/decoder.

When the intra-prediction modes are sorted as described above and, for example, the index interval is set to 2, then the N secondary IPM candidate modes may be constructed with intra prediction modes having indexes 0, 2, 4, 8, 10, . . . . The intra-prediction mode index finally encoded may be indexed as 0, 1, 2, . . . N–1, and the corresponding information may be encoded.

When the intra-prediction modes are sorted as described above and, for example, the index interval is set to 4, then the N secondary IPM candidate modes may be constructed with intra prediction modes having indexes 0, 4, 8, 16, . . . . The intra-prediction mode index finally encoded may be indexed as 0, 1, 2, . . . N–1, and the corresponding information may be encoded.

[Step 2] When a current intra-prediction mode is identical to one of the secondary IPM candidate modes, then index thereof (SMPM index) may be encoded.

[Step 3] When the current intra-prediction mode is not identical to any of the secondary IPM candidate modes, IPM index may be encoded in a existing way. The overall pseudo code may be as table 2.

TABLE 2

```
if (MPM flag ==1) encoding MPM index
else{ if (secondary MPM flag ==1) encoding SMPM index
else encoding IPM index }
```

While encoding of the intra-prediction mode using the secondary IPM candidate mode, information to be transmitted may be entropy encoded/decoded in at least one of a video parameter set, a sequence parameter set, a picture parameter set, an adaptation parameter set, a slice header, a coding unit, a prediction unit, and a transform unit, or may be implicitly set in the encoder/decoder according to the same method. Alternatively, while entropy encoding/decoding the at least one information of the above information, the information may be encoded by using one of the following binarization methods.

a truncated rice binarization method
a K-th order Exp_Golomb binarization method
a restricted K-th order Exp_Golomb binarization method
a fixed-length binarization method
a unary binarization method
a truncated unary binarization method A decoding process may be performed as follows according to a series of procedures that take place during the encoding process.

In one embodiment, when an MPM flag is "1", then an intra-prediction mode value may be decoded through a MPM candidate list and an LPK index.

In one embodiment, when the MPM flag is "0" but a Secondary MPM flag is "1", then the secondary IPM candidate modes may be generated based on the same criteria set for the encoder/decoder and the intra-prediction mode value may be decode by decoding a SMPM index value.

In one embodiment, when the above two flags are "0", then the intra-prediction mode value may be decoded through an IPM index. An intra-prediction mode corresponding to the decoded IPM index may be set as an intra-prediction mode of a current block. Alternatively, the intra-prediction mode of the current block may be derived by adding a predetermined value to the IPM index through a comparison between the decoded IPM index and a MPM candidate value and/or a SIPM candidate value. The predetermined value may be determined based on the number of MPM candidate value that is equal to or smaller than the decoded IPM index and/or the number of SIPM candidate values that is equal to or smaller than the decoded IPM index. For the above comparison, the MPM candidate value and/or the SIPM candidate value may be sorted in an ascending order or in a descending order. In one embodiment, the MPM candidate value and/or the SIPM candidate value may be sorted in an ascending order, and the sorted values may be compared with the decoded IPM index sequentially. When the decoded IPM index is equal to or greater than the MPM candidate value and/or the SIPM candidate value, the decoded IPM index is increased by 1.

Such a process may be repeated as many times as the number of an MPM candidate value and/or SIPM candidate values that are equal to or smaller than the decoded IPM index. When the decoded IPM index is smaller than the MPM candidate value and/or a SIPM candidate value, the step of increasing the IPM index by 1 may be finished.

In the above embodiment, the flag being "1" may represent that the current intra-prediction mode is identical to one of the MPM candidate modes or the secondary IPM candidate modes. The flag may be expressed as 1 or 0. As described above, one of decoding methods of an intra-prediction mode may be selectively used among an intra prediction mode decoding method based on MPM candidate (first method), an intra prediction mode decoding method based on a secondary IPM candidate (second method), and an intra prediction mode decoding method based on a remaining IPM mode (third method) by sequentially signaling the flag information. However, it is not limited thereto, and an identifier indicating one of the three methods may be used.

While entropy encoding the at least one information of the above information, the information may be encoded by using one of the following binarization methods:

a truncated rice binarization method a K-th order Exp_Golomb binarization method a restricted K-th order Exp_Golomb binarization method a fixed-length binarization method a unary binarization method a truncated unary binarization method In one embodiment, a SMPM index and an IPM index may be entropy encoded in FLC or in TU. In one embodiment, the SMPM index may be binarized in FLC, and the IPM index may be encoded/decoded in TU. In one embodiment, the SMPM index may be binarized in TU, and the IPM index may be encoded/decoded in FLC. Syntaxes required to apply the present invention are indicated in the following table 3, and areas including respective syntaxes may be changed. For example, the below "log2_secondary_IPM_number_minus2" may be transmitted through SPS or a slice header, and at least one of the binarization methods described above may be used except for entropy encoding defined in table 3.

TABLE 3

| | Syntax | Descriptor |
|---|---|---|
| Whether or not Secondary IPM is applied | secondary_IPM_enabled_flag | u(1) |
| Number of used Secondary IPM | log2_secondary_IPM_number_minus2 | u(2) |
| MPM flag | prev_intra_luma_pred_flag | ae(v) |
| MPM index | mpm_idx | ae(v) |
| SMPM flag | secondary_intra_luma_pred_flag | ae(v) |
| SMPM index | secondary_mpm_idx | ae(v) |
| IPM index | rem_intra_luma_pred_mode | ae(v) |

In the above-described embodiments, the methods are described based on the flowcharts with a series of steps or units, but the present invention is not limited to the order of the steps, and rather, some steps may be performed simultaneously or in different order with other steps. In addition, it should be appreciated by one of ordinary skill in the art that the steps in the flowcharts do not exclude each other and that other steps may be added to the flowcharts or some of the steps may be deleted from the flowcharts without influencing the scope of the present invention.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alterations, modifications and variations that fall within the spirit and scope of the appended claims.

The computer-readable storage medium may include a program instruction, a data file, a data structure, and the like either alone or in combination thereof. The program instruction recorded in the computer-readable storage medium may be any program instruction particularly designed and structured for the present invention or known to those skilled in the field of computer software. Examples of the computer-readable storage medium include magnetic recording media such as hard disks, floppy disks and magnetic tapes; optical data storage media such as CD-ROMs or DVD-ROMs; magneto-optical media such as floptical disks; and hardware devices, such as read-only memory (ROM), random-access memory (RAM), and flash memory, which are particularly structured to store and implement the program instruction. Examples of the program instruction include not only a mechanical language code formatted by a compiler but also a high level language code which may be implemented by a computer using an interpreter. The hardware devices may be configured to be operated by one or more software modules or vice versa to conduct the processes according to the present invention.

Although the present invention has been described in terms of specific items such as detailed elements as well as the limited embodiments and the drawings, they are only provided to help more general understanding of the invention, and the present invention is not limited to the above embodiments. It will be appreciated by those skilled in the art to which the present invention pertains that various modifications and changes may be made from the above description.

Therefore, the spirit of the present invention shall not be limited to the above-described embodiments, and the entire scope of the appended claims and their equivalents will fall within the scope and spirit of the invention.

INDUSTRIAL APPLICABILITY

The present invention may be used for encoding/decoding an image.

The invention claimed is:

1. An image decoding method performed by an image decoding apparatus, the method comprising:

decoding flag information indicating that an intra prediction mode of a current block is in a candidate mode set;

decoding index information indicating the intra prediction mode of the current block from among candidate modes in the candidate mode set;

deriving the intra prediction mode of the current block based on the index information; and generating a predicted block of the current block based on the intra prediction mode of the current block, wherein the candidate mode set includes a candidate mode derived based on an intra prediction mode of a left block adjacent to the current block and an intra prediction mode of an upper block adjacent to the current block, wherein based on a case that (i) the intra prediction mode of the left block is equal to the intra prediction mode of the upper block and (ii) the intra prediction mode of the left block is a planar mode or a DC mode, the candidate mode set includes a candidate mode for a mode number corresponding to a mode number 50 of a vertical mode plus 4 and a candidate mode for a mode number corresponding to a mode number 50 of the vertical mode minus 4.

2. The method of claim 1, wherein the index information is configured by up to 4 bits.

3. An image encoding method performed by an image encoding apparatus, the method comprising:

determining an intra prediction mode of a current block;

encoding flag information indicating that the intra prediction mode of the current block is in a candidate mode set; and encoding index information indicating the intra prediction mode of the current block from among candidate modes in the candidate mode set;

wherein the candidate mode set includes a candidate mode derived based on an intra prediction mode of a left block adjacent to the current block and an intra prediction mode of an upper block adjacent to the current block, wherein based on a case that (i) the intra prediction mode of the left block is equal to the intra prediction mode of the upper block and (ii) the intra prediction mode of the left block is a planar mode or a DC mode, the candidate mode set includes a candidate mode for a mode number corresponding to a mode number 50 of a vertical mode plus 4 and a candidate mode for a mode number corresponding to a mode number 50 of the vertical mode minus 4.

4. The method of claim 3, wherein the index information is configured by up to 4 bits.

5. A transmission method for image data, the method comprising:

obtaining a bitstream generated by an image encoding method, wherein the image encoding method comprises determining an intra prediction mode of a current block, encoding flag information indicating that the intra prediction mode of the current block is in a candidate mode set, and encoding index information indicating the intra prediction mode of the current block from among candidate modes in the candidate mode set; and transmitting the image data comprising the bitstream, wherein the candidate mode set includes a candidate mode derived based on an intra prediction mode of a left block adjacent to the current block and an intra prediction mode of an upper block adjacent to the current block, wherein based on a case that (i) the intra prediction mode of the left block is equal to the intra prediction mode of the upper block and (ii) the intra prediction mode of the left block is a planar mode or a DC mode, the candidate mode set includes a candidate mode for a mode number corresponding to a mode number 50 of a vertical mode plus 4 and a candidate mode for a mode number corresponding to a mode number 50 of the vertical mode minus 4.

6. The method of claim 5, wherein the index information is configured by up to 4 bits.

* * * * *